(12) United States Patent
Hayashi et al.

(10) Patent No.: US 8,650,655 B2
(45) Date of Patent: Feb. 11, 2014

(54) INFORMATION PROCESSING APPARATUS AND INFORMATION PROCESSING PROGRAM

(75) Inventors: Ryotaro Hayashi, Kanagawa (JP);
Fukutomo Nakanishi, Tokyo (JP);
Mikio Hashimoto, Tokyo (JP);
Hiroyoshi Haruki, Kanagawa (JP);
Yurie Fujimatsu, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 260 days.

(21) Appl. No.: 13/197,417

(22) Filed: Aug. 3, 2011

(65) Prior Publication Data

US 2012/0066770 A1 Mar. 15, 2012

(30) Foreign Application Priority Data

Sep. 13, 2010 (JP) ................ P2010-204799

(51) Int. Cl.
*G06F 21/00* (2013.01)
(52) U.S. Cl.
USPC ............ 726/26; 726/22; 726/23; 726/24; 726/25; 713/165; 713/166; 713/167; 711/5
(58) Field of Classification Search
USPC ............ 726/22–26; 713/165, 167; 711/5
See application file for complete search history.

(56) References Cited

U.S. PATENT DOCUMENTS

| 6,470,450 | B1 * | 10/2002 | Langford et al. | 713/182 |
|---|---|---|---|---|
| 6,785,820 | B1 * | 8/2004 | Muttik et al. | 726/24 |
| 7,143,436 | B2 * | 11/2006 | Yamaguchi et al. | 726/6 |
| 7,219,369 | B2 * | 5/2007 | Hashimoto et al. | 726/21 |
| 7,270,193 | B2 * | 9/2007 | Hashimoto et al. | 713/175 |
| 7,299,363 | B2 * | 11/2007 | Yamaguchi et al. | 713/189 |
| 7,424,688 | B2 * | 9/2008 | Idani et al. | 716/135 |
| 7,568,112 | B2 * | 7/2009 | Yamaguchi et al. | 713/190 |
| 7,590,869 | B2 * | 9/2009 | Hashimoto | 713/194 |
| 7,603,566 | B2 * | 10/2009 | Hashimoto et al. | 713/187 |
| 7,853,954 | B2 * | 12/2010 | Haruki et al. | 718/108 |
| 2003/0033537 | A1 * | 2/2003 | Fujimoto et al. | 713/193 |
| 2003/0050962 | A1 * | 3/2003 | Monsen et al. | 709/203 |
| 2004/0030911 | A1 * | 2/2004 | Isozaki et al. | 713/193 |
| 2004/0187019 | A1 * | 9/2004 | Nanki et al. | 713/200 |
| 2005/0289397 | A1 * | 12/2005 | Haruki et al. | 714/38 |

(Continued)

FOREIGN PATENT DOCUMENTS

| JP | 2004-240536 A | 8/2004 |
|---|---|---|
| JP | 2007052625 A | 3/2007 |
| JP | 2009-129206 A | 6/2009 |
| WO | 2010070959 A1 | 6/2010 |

OTHER PUBLICATIONS

WO2010070959 A1, English Translation, pp. 1-28, http://www.google.com/patents/WO2010070959A1?cl=en.*

(Continued)

*Primary Examiner* — Kambiz Zand
*Assistant Examiner* — Tongoc Tran
(74) *Attorney, Agent, or Firm* — Banner & Witcoff, Ltd.

(57) ABSTRACT

According to one embodiment, there is provided a an information processing apparatus, including: a program acceptance portion; a program storage portion; a first function type storage portion; a function type extraction portion; a second function type storage portion; a first alternate function type storage portion; an alternate function type extraction portion; a second alternate function type storage portion; a selection portion; a judging portion; an updating portion; and a protection attribute determination portion.

4 Claims, 30 Drawing Sheets

(56) References Cited

U.S. PATENT DOCUMENTS

| | | |
|---|---|---|
| 2007/0050619 A1* | 3/2007 | Miyamori et al. ............ 713/164 |
| 2008/0034010 A1* | 2/2008 | Quan et al. .................... 707/201 |
| 2009/0138729 A1* | 5/2009 | Hashimoto et al. ........... 713/193 |
| 2011/0296192 A1 | 12/2011 | Hayashi et al. |

OTHER PUBLICATIONS

Notifications of Reasons for Refusal for Japanese patent application No. 2010-204799 mailed Sep. 7, 2012.

Aslan Askarov, et al, Cryptographically-Masked Flows, In Proc. 13th International Static Analysis Symposium, Seoul, Korea, Aug. 2006. LNCS. Springer-Verlag.

Mikio Hashimoto, et al., Secure Processor Consistent with Both Foreign Software Protection and User Privacy Protection B. Christianson et al. (Eds.): Security Protocols 2004, LNCS 3957, pp. 276-286, 2006. Springer Verlag Berlin Heidelberg 2006.

Li Gong, et al., Reasoning about Belief in Cryptographic Protocols Published in Proceedings of the IEEE 1990 Symposium on Security and Privacy, Oakland, California, May, 1990, pp. 234-248.

* cited by examiner

FIG. 4

```
1:   // INITIAL DATA (WITH INITIAL PROTECTION ATTRIBUTE)
2:   CONST CONFIDENTIAL SKA
3:   // PARAMETERS
4:   CONST INT RSIZE
5:   CONST INT SIGSIZE
6:   // VARIABLE DECLARATION
7:   INT SIZE
8:   BYTE BUF[4096]
9:   RA
10:  RB
11:  SIGN
12:  // PROCESSING
13:  PHYSICAL RANDOM(RA)
14:  OUTPUT(RA, RSIZE)
15:  INPUT(BUF, SIZE)
16:  RB=BUF
17:
18:  SIGN2(RA, RB, SKA, SIGN)
19:
20:  OUTPUT(SIGN, SIGSIZE)
```

FIG. 5

| ATTRIBUTE NAME | MEANINGS | INTEGRITY | | CONFIDENTIALITY | |
|---|---|---|---|---|---|
| | | PROTECTED | PROPERTY | PROTECTED | PROPERTY |
| EXPOSED | A VARIABLE OF WHICH A VALUE IS STORED IN THE NON-PROTECTED MEMORY AREA AND A VALUE DOES NOT HAVE EITHER INTEGRITY OR CONFIDENTIALITY. AN EXTERNAL ENTITY SUCH AS AN OS CAN CHANGE AND REFER TO THE VALUE FREELY. | − | × | − | × |
| FIXED | A VARIABLE OF WHICH A VALUE IS STORED IN THE MEMORY AREA WHERE AT LEAST INTEGRITY IS PROTECTED, AND A VALUE DOES NOT HAVE EITHER INTEGRITY OR CONFIDENTIALITY. AN EXTERNAL ENTITY SUCH AS AN OS CAN REFER TO THE VALUE BUT CANNOT CHANGE (FALSIFY) THE VALUE. | + | × | −(+) | × |
| VERIFIED | A VARIABLE OF WHICH A VALUE IS STORED IN THE MEMORY AREA WHERE AT LEAST INTEGRITY IS PROTECTED, AND A VALUE HAS INTEGRITY BUT DOES NOT HAVE CONFIDENTIALITY. AN EXTERNAL ENTITY SUCH AS AN OS CAN REFER TO THE VALUE BUT CANNOT CHANGE (FALSIFY) THE VALUE. | + | ○ | −(+) | × |
| HIDDEN | A VARIABLE OF WHICH A VALUE IS STORED IN THE MEMORY AREA WHERE AT LEAST CONFIDENTIALITY IS PROTECTED, AND A VALUE DOES NOT HAVE EITHER INTEGRITY OR CONFIDENTIALITY. | +/− | × | + | × |
| CONCEALED | A VARIABLE OF WHICH A VALUE IS STORED IN THE MEMORY AREA WHERE AT LEAST CONFIDENTIALITY IS PROTECTED, AND A VALUE HAS CONFIDENTIALITY BUT DOES NOT HAVE INTEGRITY. | +/− | × | + | ○ |
| CONFIDENTIAL | A VARIABLE OF WHICH A VALUE IS STORED IN THE MEMORY AREA WHERE BOTH INTEGRITY AND CONFIDENTIALITY ARE PROTECTED, AND A VALUE HAS BOTH INTEGRITY AND CONFIDENTIALITY. | + | ○ | + | ○ |

| EXPLANATORY NOTES | |
|---|---|
| ○ | THE PROPERTY IS GUARANTEED (CONFIRMED). |
| × | THE PROPERTY IS NOT GUARANTEED (UNCONFIRMED OR NO PROPERTY). |
| + | THE MEMORY IS PROTECTED. |
| +/− | THE MEMORY MAY BE PROTECTED OR NON-PROTECTED. |
| −(+) | THE MEMORY IS NOT PROTECTED BUT MAY BE PROTECTED WHEN THE EXTERNAL ENTITY DOES NOT REFER TO THE VALUE. |
| − | THE MEMORY IS NOT PROTECTED. |

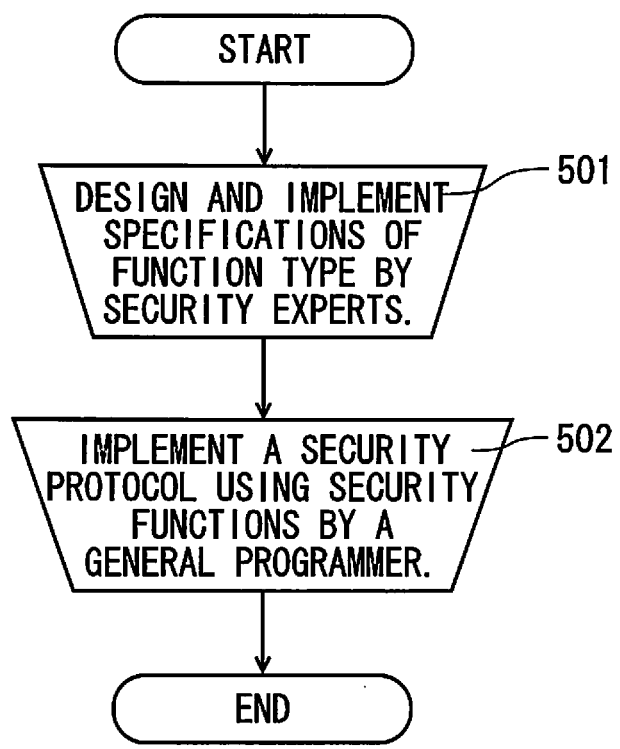

FIG. 9

| CLASSI-FICATION | NON-SECURITY FUNCTION NAME | OVERLOADED DEFINITION SYMBOL | FIRST VARIABLE | | SECOND VARIABLE | |
|---|---|---|---|---|---|---|
| | | | MEANINGS | PROTECTION ATTRIBUTE | MEANINGS | PROTECTION ATTRIBUTE |
| INPUT | INPUT | A | INPUT | EXPOSED | SIZE | EXPOSED |
| OUTPUT | OUTPUT | A | OUTPUT | EXPOSED | SIZE | EXPOSED |
| | | B | | VERIFIED | | VERIFIED |

FIG. 10

| REAL_SECURITY FUNCTION NAME | OVERLOADED DEFINITION SYMBOL | FIRST VARIABLE | | SECOND VARIABLE | | THIRD VARIABLE | | FOURTH VARIABLE | |
|---|---|---|---|---|---|---|---|---|---|
| | | MEANINGS | PROTECTION ATTRIBUTE | MEANINGS | PROTECTION ATTRIBUTE | MEANINGS | PROTECTION ATTRIBUTE | MEANINGS | PROTECTION ATTRIBUTE |
| #2211_PHYSICALRANDOM | A | | CONFIDENTIAL | | | | | | |
| | B | RANDOM NUMBER | CONCEALED | | | | | | |
| | C | | VERIFIED | | | | | | |
| #2214_SIGN2 | A | INPUT MESSAGE 1 | CONFIDENTIAL | INPUT MESSAGE 2 | CONFIDENTIAL | SECRET KEY | CONFIDENTIAL | SIGNATURE | CONFIDENTIAL |
| | B | | VERIFIED | | VERIFIED | | CONFIDENTIAL | | VERIFIED |

| REAL_NON-SECURITY FUNCTION NAME | OVERLOADED DEFINITION SYMBOL | FIRST VARIABLE | | SECOND VARIABLE | |
|---|---|---|---|---|---|
| | | MEANINGS | PROTECTION ATTRIBUTE | MEANINGS | PROTECTION ATTRIBUTE |
| #2401_INPUT | A | INPUT | EXPOSED | SIZE | EXPOSED |
| #2402_OUTPUT | A | OUTPUT | EXPOSED | SIZE | EXPOSED |
| | B | | VERIFIED | | VERIFIED |
| #2403_OUTPUT | A | OUTPUT | EXPOSED | SIZE | EXPOSED |
| | B | | VERIFIED | | VERIFIED |

FIG. 11A

| NO. | SPECIFIC PROCEDURE | | FUNCTION TYPE | | | | | | | | | | | | |
|---|---|---|---|---|---|---|---|---|---|---|---|---|---|---|---|
| | | | CLASSIFICATION | | SECURITY FUNCTION NAME | OVERLOADED DEFINITION SYMBOL | FIRST VARIABLE | | | SECOND VARIABLE | | | THIRD VARIABLE | | |
| | | | | | | | MEANINGS | PROTECTION ATTRIBUTE | | MEANINGS | PROTECTION ATTRIBUTE | | MEANINGS | PROTECTION ATTRIBUTE | |
| 1 | START POINT SECURITY FUNCTION NAME AND SPECIFIC OUTPUT | END POINT SECURITY FUNCTION NAME AND SPECIFIC INPUT | PUBLIC KEY SIGNATURE | SIGNATURE GENERATION (2 MESSAGES) | SIGN2 | X | INPUT MESSAGE 1 | CONFIDENTIAL | | INPUT MESSAGE 2 | CONCEALED | | SECRET KEY | CONFIDENTIAL | |
| | | | | | | Y | | VERIFIED | | | EXPOSED | | | CONFIDENTIAL | |
| | PHYSICAL/RANDOM (#1) | SIGN2 (#1) | | | | | | | | | | | | | |
| 2 | START POINT SECURITY FUNCTION NAME AND SPECIFIC OUTPUT | END POINT SECURITY FUNCTION NAME AND SPECIFIC INPUT | PUBLIC KEY SIGNATURE | SIGNATURE GENERATION (2 MESSAGES) | SIGN2 | X | INPUT MESSAGE 1 | CONCEALED | | INPUT MESSAGE 2 | CONFIDENTIAL | | SECRET KEY | CONFIDENTIAL | |
| | | | | | | Y | | EXPOSED | | | VERIFIED | | | CONFIDENTIAL | |
| | PHYSICAL/RANDOM (#1) | SIGN2 (#2) | | | | | | | | | | | | | |
| 3 | START POINT SECURITY FUNCTION NAME AND SPECIFIC OUTPUT | END POINT SECURITY FUNCTION NAME AND SPECIFIC INPUT | PUBLIC KEY SIGNATURE | SIGNATURE GENERATION (2 MESSAGES) | SIGN2 | X | INPUT MESSAGE 1 | CONFIDENTIAL | | INPUT MESSAGE 2 | CONCEALED | | SECRET KEY | CONFIDENTIAL | |
| | | | | | | Y | | VERIFIED | | | EXPOSED | | | CONFIDENTIAL | |
| | PHYSICAL/RANDOM (#1) | HASH (#1) | | | | | | | | | | | | | |
| | HASH (#2) | SIGN2 (#1) | | | | | | | | | | | | | |

| FOURTH VARIABLE | | |
|---|---|---|
| MEANINGS | PROTECTION ATTRIBUTE | |
| SIGNATURE | CONFIDENTIAL | |
| | VERIFIED | |
| SIGNATURE | CONFIDENTIAL | |
| | VERIFIED | |
| SIGNATURE | CONFIDENTIAL | |
| | VERIFIED | |

| NO. | SPECIFIC PROCEDURE | | FUNCTION TYPE | | | | | | | | |
|---|---|---|---|---|---|---|---|---|---|---|---|
| | START POINT SECURITY FUNCTION NAME AND SPECIFIC OUTPUT | END POINT SECURITY FUNCTION NAME AND SPECIFIC INPUT | REAL SECURITY FUNCTION NAME | OVERLOADED DEFINITION SYMBOL | FIRST VARIABLE | | SECOND VARIABLE | | THIRD VARIABLE | | FOURTH VARIABLE | |
| | | | | | MEANINGS | PROTECTION ATTRIBUTE | MEANINGS | PROTECTION ATTRIBUTE | MEANINGS | PROTECTION ATTRIBUTE | MEANINGS | PROTECTION ATTRIBUTE |
| 1 | #2211_PHYSICAlRANDOM(#1) | #2214_SIGN2(#1) | #2214_SIGN2 | X | INPUT MESSAGE 1 | CONFIDENTIAL | INPUT MESSAGE 2 | CONCEALED | SECRET KEY | CONFIDENTIAL | SIGNATURE | CONFIDENTIAL |
| | | | | Y | | VERIFIED | | EXPOSED | | CONFIDENTIAL | | VERIFIED |
| 2 | #2211_PHYSICAlRANDOM(#1) | #2214_SIGN2(#2) | #2214_SIGN2 | X | INPUT MESSAGE 1 | CONCEALED | INPUT MESSAGE 2 | CONFIDENTIAL | SECRET KEY | CONFIDENTIAL | SIGNATURE | CONFIDENTIAL |
| | | | | Y | | EXPOSED | | VERIFIED | | CONFIDENTIAL | | VERIFIED |

FIG. 15

| PARTIAL DATA FLOW NO. | VARIABLE, FUNCTION INPUT/OUTPUT |
|---|---|
| 1 | #2211_PHYSICAlRANDOM(#1) <br> RA <br> #2402_OUTPUT(#1) <br> #2214_SIGN2(#1) |
| 2 | RSIZE <br> #2402_OUTPUT(#2) |
| 3 | #2214_SIGN2(#2) <br> RB <br> BUF <br> #2401_INPUT(#1) |
| 4 | #2401_INPUT(#2) <br> SIZE |
| 5 | SKA <br> #2214_SIGN2(#3) |
| 6 | #2214_SIGN2(#4) <br> SIGN <br> #2403_OUTPUT(#1) |
| 7 | SIGSIZE <br> #2403_OUTPUT(#2) |

*FIG. 16*

| VARIABLE NAME | PROTECTION ATTRIBUTE |
|---|---|
| SKA | CONFIDENTIAL |
| RSIZE | VERIFIED |
| SIGSIZE | VERIFIED |
| SIZE | EXPOSED |
| BUF | EXPOSED |
| RA | VERIFIED |
| RB | EXPOSED |
| SIGN | VERIFIED |

FIG. 19

| PARTIAL DATA FLOW NO. | VARIABLE, FUNCTION INPUT/OUTPUT | DETERMINED PROTECTION ATTRIBUTE | PROTECTION ATTRIBUTE CANDIDATE |
|---|---|---|---|
| 1 | #2211_PHYSICAIRANDOM (#1) <br> RA <br> #2402_OUTPUT (#1) <br> #2214_SIGN2 (#1) | | VERIFIED/CONCEALED/CONFIDENTIAL <br> EXPOSED/VERIFIED <br> VERIFIED/CONFIDENTIAL |
| 2 | RSIZE <br> #2402_OUTPUT (#2) | | EXPOSED/VERIFIED |
| 3 | #2214_SIGN2 (#2) <br> RB <br> BUF <br> #2401_INPUT (#1) | | VERIFIED/CONFIDENTIAL <br> EXPOSED |
| 4 | #2401_INPUT (#2) <br> SIZE | | EXPOSED |
| 5 | SKA <br> #2214_SIGN2 (#3) | | CONFIDENTIAL <br> CONFIDENTIAL |
| 6 | #2214_SIGN2 (#4) <br> SIGN <br> #2403_OUTPUT (#1) | | VERIFIED/CONFIDENTIAL <br> EXPOSED/VERIFIED |
| 7 | SIGSIZE <br> #2403_OUTPUT (#2) | | EXPOSED/VERIFIED |

FIG. 21

| REAL_SECURITY FUNCTION NAME | OVERLOADED DEFINITION SYMBOL | FIRST VARIABLE | | SECOND VARIABLE | | THIRD VARIABLE | | FOURTH VARIABLE | |
|---|---|---|---|---|---|---|---|---|---|
| | | MEANINGS | PROTECTION ATTRIBUTE | MEANINGS | PROTECTION ATTRIBUTE | MEANINGS | PROTECTION ATTRIBUTE | MEANINGS | PROTECTION ATTRIBUTE |
| #2211_PHYSICALRANDOM | A | | CONFIDENTIAL | | | | | | |
| | B | RANDOM NUMBER | CONCEALED | | | | | | |
| | C | | VERIFIED | | | | | | |
| #2214_SIGN2 | A | INPUT MESSAGE 1 | CONFIDENTIAL | INPUT MESSAGE 2 | CONCEALED | SECRET KEY | CONFIDENTIAL | SIGNATURE | CONFIDENTIAL |
| | B | | VERIFIED | | EXPOSED | | CONFIDENTIAL | | VERIFIED |

| REAL_NON-SECURITY FUNCTION NAME | OVERLOADED DEFINITION SYMBOL | FIRST VARIABLE | | SECOND VARIABLE | |
|---|---|---|---|---|---|
| | | MEANINGS | PROTECTION ATTRIBUTE | MEANINGS | PROTECTION ATTRIBUTE |
| #2401_INPUT | A | INPUT | EXPOSED | SIZE | EXPOSED |
| #2402_OUTPUT | A | OUTPUT | EXPOSED | SIZE | EXPOSED |
| | B | OUTPUT | VERIFIED | | VERIFIED |
| #2403_OUTPUT | A | OUTPUT | EXPOSED | SIZE | EXPOSED |
| | B | | VERIFIED | | VERIFIED |

FIG. 22

| PARTIAL DATA FLOW NO. | VARIABLE, FUNCTION INPUT/OUTPUT | DETERMINED PROTECTION ATTRIBUTE | PROTECTION ATTRIBUTE CANDIDATE |
|---|---|---|---|
| 1 | #2211_PHYSICAIRANDOM (#1) RA | | VERIFIED/CONCEALED/CONFIDENTIAL |
| | #2402_OUTPUT (#1) | | EXPOSED/VERIFIED |
| | #2214_SIGN2 (#1) | | VERIFIED/CONFIDENTIAL |
| 2 | RSIZE | | EXPOSED/VERIFIED |
| | #2402_OUTPUT (#2) | | |
| 3 | #2214_SIGN2 (#2) | | VERIFIED/CONFIDENTIAL |
| | RB | | |
| | BUF | | EXPOSED |
| | #2401_INPUT (#1) | | |
| 4 | #2401_INPUT (#2) | | EXPOSED |
| | SIZE | | |
| 5 | SKA | | CONFIDENTIAL |
| | #2214_SIGN2 (#3) | | CONFIDENTIAL |
| 6 | #2214_SIGN2 (#4) | | VERIFIED/CONFIDENTIAL |
| | SIGN | | |
| | #2403_OUTPUT (#1) | | EXPOSED/VERIFIED |
| 7 | SIGSIZE | | EXPOSED/VERIFIED |
| | #2403_OUTPUT (#2) | | |

COINCIDENCE ENABLED (between row 3 #2214_SIGN2 (#2) VERIFIED/CONFIDENTIAL entries)

| PARTIAL DATA FLOW NO. | VARIABLE, FUNCTION INPUT/OUTPUT | PROTECTION ATTRIBUTE CANDIDATE (INITIAL VALUE) | PROTECTION ATTRIBUTE CANDIDATE (PHASE 1) | PROTECTION ATTRIBUTE CANDIDATE (PHASE 2) | PROTECTION ATTRIBUTE CANDIDATE (PHASE 3) |
|---|---|---|---|---|---|
| 1 | #2211_PHYSICAlRANDOM (#1) | VERIFIED/CONCEALED/CONFIDENTIAL | VERIFIED/CONCEALED/CONFIDENTIAL | VERIFIED | VERIFIED |
|   | RA | EXPOSED/VERIFIED | EXPOSED/VERIFIED | VERIFIED | VERIFIED |
|   | #2402_OUTPUT (#1) | | | | |
|   | #2214_SIGN2 (#1) | VERIFIED/CONFIDENTIAL | VERIFIED | VERIFIED | VERIFIED |
| 2 | RSIZE | | | | |
|   | #2402_OUTPUT (#2) | EXPOSED/VERIFIED | EXPOSED/VERIFIED | VERIFIED | VERIFIED |
|   | #2214_SIGN2 (#2) | VERIFIED/CONFIDENTIAL | EXPOSED | | |
| 3 | RB | | EXPOSED | EXPOSED | EXPOSED |
|   | BUF | EXPOSED | EXPOSED | EXPOSED | EXPOSED |
|   | #2401_INPUT (#1) | | EXPOSED | EXPOSED | EXPOSED |
| 4 | #2401_INPUT (#2) | EXPOSED | EXPOSED | EXPOSED | EXPOSED |
|   | SIZE | | | | |
| 5 | SKA | CONFIDENTIAL | CONFIDENTIAL | CONFIDENTIAL | CONFIDENTIAL |
|   | #2214_SIGN2 (#3) | CONFIDENTIAL | CONFIDENTIAL | CONFIDENTIAL | CONFIDENTIAL |
| 6 | #2214_SIGN2 (#4) | VERIFIED/CONFIDENTIAL | VERIFIED | VERIFIED | VERIFIED |
|   | SIGN | EXPOSED/VERIFIED | EXPOSED/VERIFIED | EXPOSED/VERIFIED | EXPOSED/VERIFIED |
|   | #2403_OUTPUT (#1) | | | | |
| 7 | SIGSIZE | EXPOSED/VERIFIED | EXPOSED/VERIFIED | EXPOSED/VERIFIED | EXPOSED/VERIFIED |
|   | #2403_OUTPUT (#2) | | | | |

```
1:   // INITIAL DATA (WITH INITIAL PROTECTION ATTRIBUTE)
2:   CONST CONFIDENTIAL SKA
3:   // PARAMETERS
4:   CONST VERIFIED INT RSIZE
5:   CONST VERIFIED INT SIGSIZE
6:   // DECLARATION OF VARIABLE "WITH PROTECTION ATTRIBUTE"
7:   EXPOSED INT SIZE
8:   EXPOSED BYTE BUF[4096]
9:   VERIFIED RA
10:  EXPOSED RB
11:  VERIFIED SIGN
12:  // PROCESSING
13:  PHYSICAL RANDOM(RA)
14:  OUTPUT(RA, RSIZE)
15:  INPUT(BUF, SIZE)
16:  RB=BUF
17:
18:  SIGN2(RA, RB, SKA, SIGN)
19:
20:  OUTPUT(SIGN, SIGSIZE)
```

US 8,650,655 B2

INFORMATION PROCESSING APPARATUS AND INFORMATION PROCESSING PROGRAM

CROSS-REFERENCE TO RELATED APPLICATION(S)

This application claims priority from Japanese Patent Application No. 2010-204799 filed on Sep. 13, 2010, the entire contents of which are incorporated herein by reference.

FIELD

Embodiments described hereto relate generally to determination of an attribute such as a variable of a program.

BACKGROUND

For safe implementation of a security protocol, it has been heretofore necessary to properly determine whether data is to be protected for each variable in a program or not. There is hence a protection attribute determination method which pays attention to security functions such as encryption, signature, hash function, etc. included in the security protocol. In this method, a protection attribute requiring that a value of each input/output variable is stored in a protected memory area or a non-protected memory area based on presence/absence of confidentiality property and integrity property is defined for each security function, so that the protection attribute of each variable in the program is determined based on this restriction. As for a security protocol using a value transmitted from the outside or a value shared with the outside as an encryption key, protection attributes are determined.

However, this method gives no consideration to processing path information such that some (start point) function returns a value of variables as output and some (end point) function takes the value of the variables (returned from the start point function) as input (via some processes).

BRIEF DESCRIPTION OF THE DRAWINGS

FIG. 4 illustrates a target program according to the first embodiment.

FIG. 5 illustrates protection attribute definition information according to the first embodiment.

FIG. 7 illustrates a development flow of security functions and program according to the first embodiment.

FIG. 9 illustrates function type information of each non-security function according to the first embodiment.

FIG. 10 illustrates real function type information of a target program according to the first embodiment.

FIG. 11 illustrates alternate function type information according to the first embodiment.

FIG. 13 illustrates alternate real function type information of the target program according to the first embodiment.

FIG. 15 illustrates a partial data flow of the target program according to the first embodiment, in a table expression.

FIG. 16 illustrates information by which variables are associated with protection attributes according to the first embodiment.

FIG. 19 illustrates a protection attribute determination table according to the first embodiment.

FIG. 21 illustrates updated real function type information according to the first embodiment.

FIG. 22 illustrates the protection attribute determination table after updating of real function type information according to the first embodiment.

FIG. 23 illustrates updating process of the protection attribute determination table according to the first embodiment.

FIG. 26 illustrates the updated target program according to the second embodiment.

DETAILED DESCRIPTION

Figure 1:
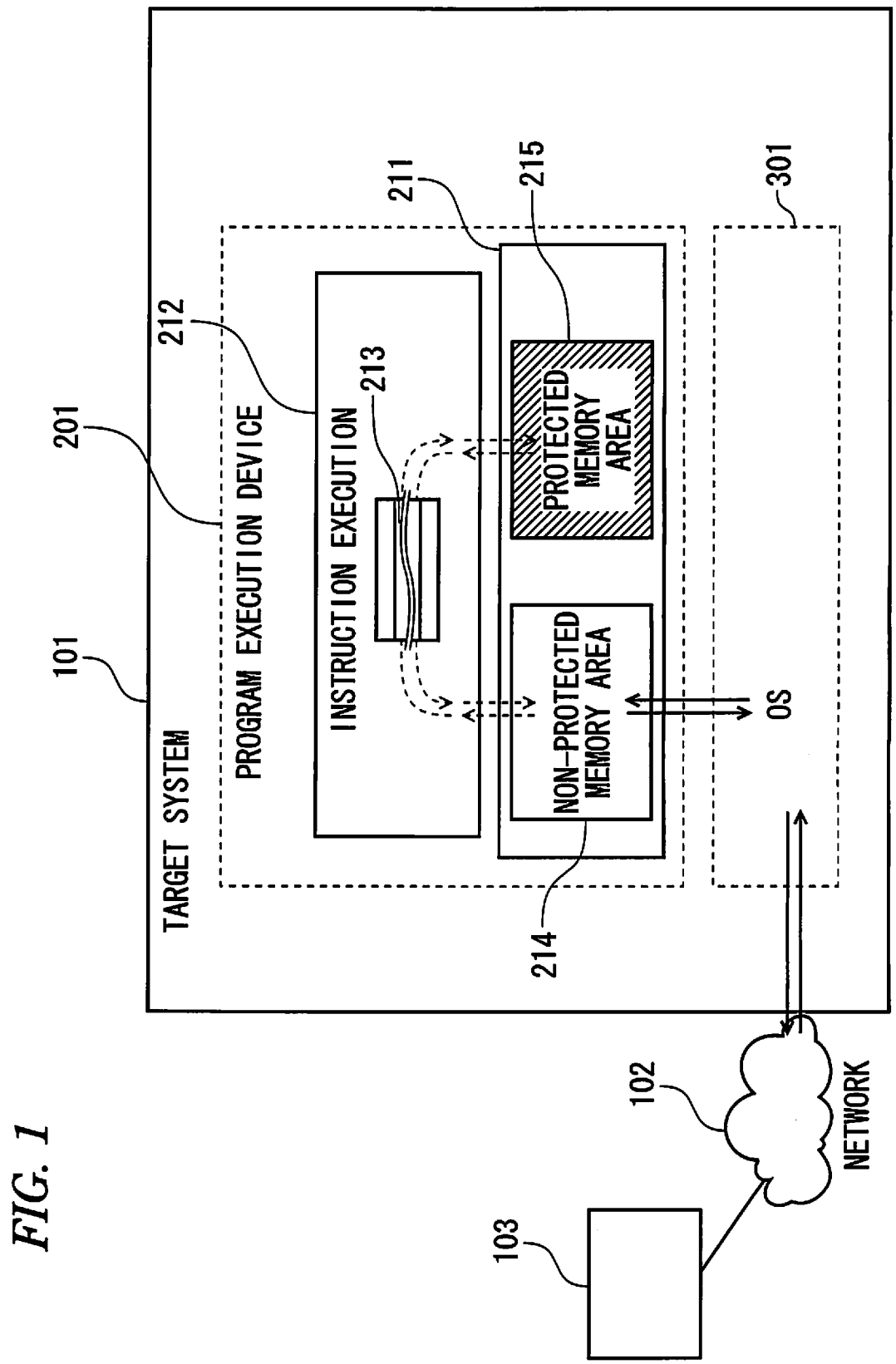
FIG. 1 illustrates a configuration of a target system according to a first embodiment.

According to one embodiment, there is provided a an information processing apparatus, including: a program acceptance portion configured to accept a program having procedure information indicating processing to be executed using a first function; a program storage portion configured to store the program accepted by the program acceptance portion; a first function type storage portion configured to store at least one piece of first function type information having protection attribute information indicating whether data put into each input variable and each output variable in the first function is stored in a protected memory area or in a non-protected memory area; a function type extraction portion configured to extract first real function type information as first function type information corresponding to first real function information based on the first function type information and first real function information which is information of the first function included in the program; a second function type storage portion configured to store the first real function type information; a first alternate function type storage portion configured to store alternate function type information by which specific procedure information indicating a specific processing using a first function is associated with at least one piece of first function type information which is information substitutable for function type information of the first function executed in the specific procedure when the specific procedure is executed; an alternate function type extraction portion configured to extract second alternate function type information which is alternate function type information corresponding to the first real function information based on the first alternate function type information and the first real function information; a second alternate function type storage portion configured to store the second alternate function type information extracted by the alternate function type extraction portion; a selection portion configured to select and acquire the second alternate function type information stored in the second alternate function type storage portion; a judging portion configured to determine whether the specific procedure information associated with the second alternate function type information selected by the selection portion is included in the procedure information of the program stored in the program storage portion or not; an updating portion configured to update the first real function type information stored in the second function type storage portion by using the first real function type information associated with the second alternate function type information selected by the selection portion in accordance with a result of the judging portion; and a protection attribute determination portion configured to determine coincident protection attribute information as protection attribute information of each variable when protection attribute information of all input/output variables of a first real function coincides with protection attribute information included in any one piece of first real function type information stored in the second function type storage portion with respect to all first real functions in the program stored in the program storage portion.

A first embodiment will be described below with reference to the accompanying drawings.

First Embodiment (1) Configuration

A target system 101 in which a program according to a security protocol provided in this embodiment is executed will be described first. FIG. 1 illustrates the configuration of the target system 101. The target system 101 is connected to an external device 103 through a network 102. The target system 101 includes a program execution device 201, and an OS (Operating System) 301.

The program execution device 201 has an instruction execution portion 212, and a storage portion 211.

The storage portion 211 has a data storage memory area. The data storage memory area has a non-protected memory area 214, and a protected memory area 215. The non-protected memory area 214 is an insecure storage area where no access control is provided. On the other hand, the protected memory area 215 is a secure storage area where access control against a specific program, process or the like, is provided. The non-protected memory area 214 and the protected memory area 215 may be formed in one storage medium or may be formed in separate storage media respectively. Such exclusive access control for a specific program or process can be achieved by use of a well-known technique.

The instruction execution portion 212 has a control portion such as a CPU (Central Processing Unit) which is a subject of execution of a program, and a register 213 for temporarily storing data at the time of execution of the program. The instruction execution portion 212 takes input and returns output by reading/writing data from/into the non-protected memory area 214 of the data storage memory area. The OS 301 performs writing of data to be taken into the program execution device 201 and reading of data to be returned from the program execution device 201. However, access to the non-protected memory area 214 is executed by not only the OS 301 but also DMA (Direct Memory Access) transfer etc. by a peripheral device under control of the OS 301.

The OS 301 is a control portion such as a CPU which is a subject of execution of basic software of the target system 101. The OS 301 accesses the non-protected memory area 214 to perform writing of input data (e.g. data received from the external device 103 through the network 102) and reading of output data (e.g. data returned to the external device 103 through the network 102). The OS 301 is allowed to read/write data from/into the non-protected memory area 214 at any timing but is prohibited to access the protected memory area 215 to thereby be disabled from reading/writing from the protected memory area 215 in the data storage memory area. Such an exclusive access mechanism for performing access control of a specific program or process is a technique which has been heretofore known.

As a point to notice, the embodiment is based on the assumption that there is a possibility that input data to the program execution device 201, output data from the program execution device 201 and data stored in the non-protected memory area 214 will be intercepted or falsified (hereinafter generically referred to as attacked) by the OS 301. When the program execution device 201 communicates with the external device 103 through the network 102, the OS 301 and the non-protected memory area 214 can be regarded as a part of the network 102 with respect to a possibility of interception of data or falsification of data. To keep security for data processing performed by the program execution device 201 in such a system, proper classification of data into two types of memories (the non-protected memory area 214 and the protected memory area 215) is important. In FIG. 1, interception or falsification of a range including the instruction execution portion 212 and the protected memory area 215 by the OS 301 is prohibited.

The embodiment is based on the assumption that instruction execution by the program execution device 201 is safe. This is because the assumption can be achieved by a heretofore known manner that a memory area (not shown in FIG. 1) in which instructions, function calls, return addresses, etc. are stored is protected from being attacked by the OS 301. However, another manner for protecting this memory area may be used, and the configuration of the target system 101 is not limited to the form shown in FIG. 1.

In the program execution device 201, the control portion of the instruction execution portion 212 and the OS 301 may be provided as one control portion or may be provided as individual control portions specialized for respective purposes. The non-protected memory area 214 and the protected memory area 215 may be provided in one storage device or the non-protected memory area 214 and the protected memory area 215 may be provided in individual storage devices respectively.

Figure 2:
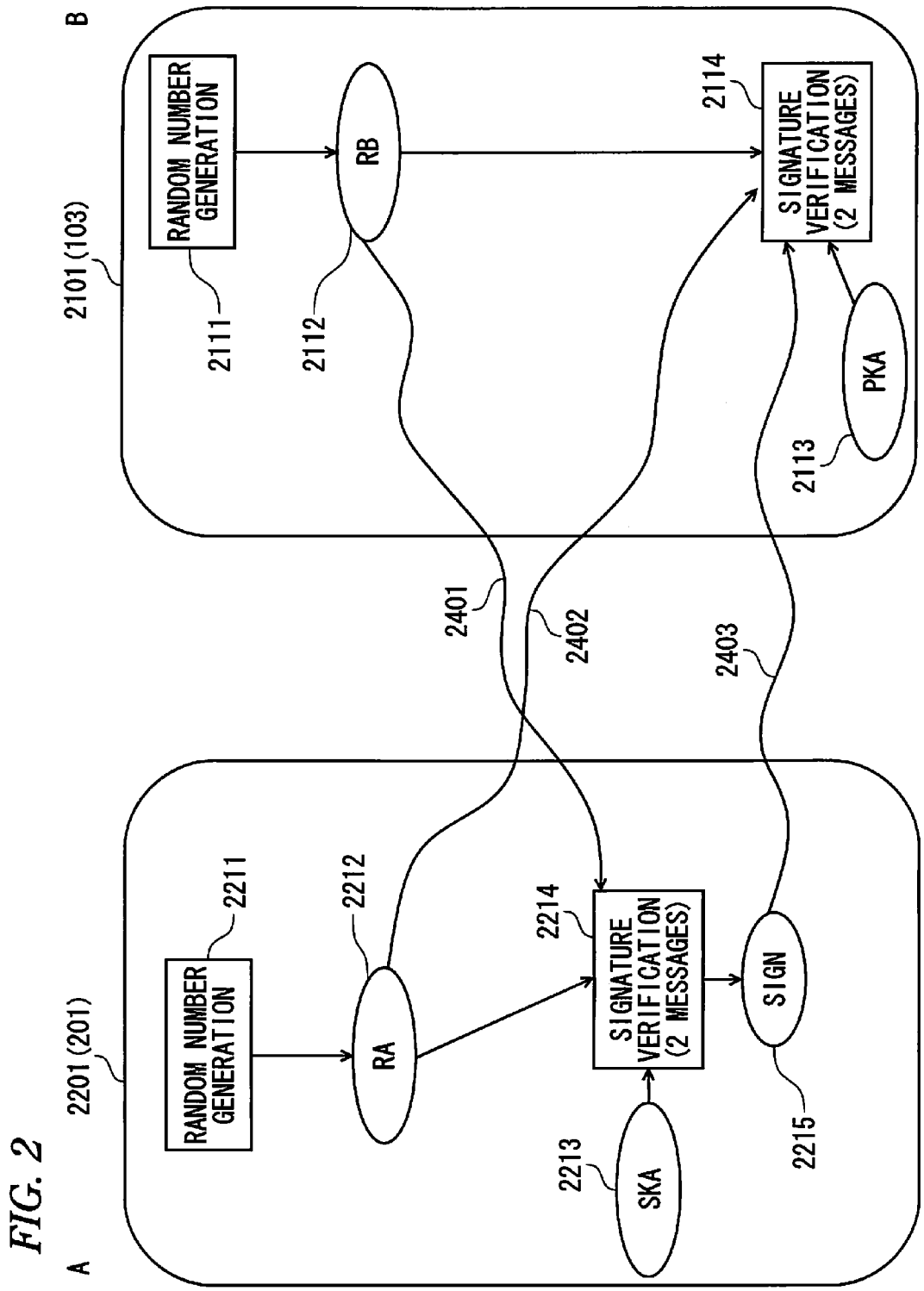
FIG. 2 illustrates a security protocol sequence according to the first embodiment.

A security protocol sequence used for description of this embodiment will be described next with reference to FIG. 2. FIG. 2 shows an example in which a system B 2101 operating in the external device 103 shown in FIG. 1 and a system A 2201 achieved by the program execution device 201 shown in FIG. 1 authenticate each other based on a challenge-and-response protocol. Pay attention here to the fact that the system B 2101 expresses the whole system including the OS whereas the system A 2201 to which a protection attribute determination process (which will be described later) according to this embodiment is applied is limited to the program execution device (201 in FIG. 1). The following description will be made with attention paid to security of implementation of the system A 2201 without description of internal operation of the system B 2101.

First, the system B 2101 acquires a public key (pkA) 2113 of the system A 2201 before execution of a security protocol. Though not shown, the system B 2101 verifies completeness of the public key (pkA) 2113 separately based on a certificate issued by CA (certificate Authority) or the like. On the other hand, a secret key (skA) 2213 of the system A 2201 is statically embedded (stored) in (the data storage memory area of) the program execution device 201 which achieves the system A 2201.

The system B 2101 generates a random number (rB) 2112 based on a random number generation function 2111 and transmits (2401) the random number (rB) 2112 to the system A 2201. Similarly, the system A 2201 generates a random number (rA) 2212 based on a random number generation function 2211 and transmits (2402) the random number (rA) 2212 to the system B 2101. The system A 2201 inputs the random number (rA) 2212 generated by the system A, the random number (rB) transmitted (2401) from the system B 2101 and the secret key (skA) 2213 into a signature generation function 2214 to generate a signature (sign) 2215, and transmits (2403) the signature to the system B 2101. The system B 2101 inputs the random number (rA) transmitted (2402) from the system A 2201, the random number (rB) 2112 generated by the system B 2101, the public key (pkA) 2113 of the system A 2201 and the signature (sign) transmitted (2403) from the system A 2201 into a signature verification function 2114 to perform signature verification.

An information processing apparatus which determines a protection attribute automatically for each variable used in a program will be described below by using the program execution device 201 operating in the aforementioned target system 101 as an example. The hardware configuration of the information processing apparatus will be described first. The information processing apparatus according to this embodiment includes a controller such as a CPU (Central Processing Unit) for generally controlling the apparatus, a storage device such as an ROM (Read Only Memory), an RAM (Random Access Memory), etc. for storing various types of data and various types of programs, an external storage device such as an HDD (Hard Disk Drive), a CD (Compact Disk) drive device, etc. for storing various types of data and various types of programs, and a bus for connecting these devices to one another. The information processing apparatus according to this embodiment has a hardware configuration using a general computer. A display device for displaying information, an input device such as a keyboard, a mouse, etc. for accepting a user's input and a communication I/F (interface) for controlling communication with the external device are individually connected to the information processing apparatus by wire or wireless.

Various types of functions realized by a hardware configuration described above, that is, the CPU of the information processing apparatus executes various types of programs stored in the storage device or the external storage device, will be described.

Figure 3:
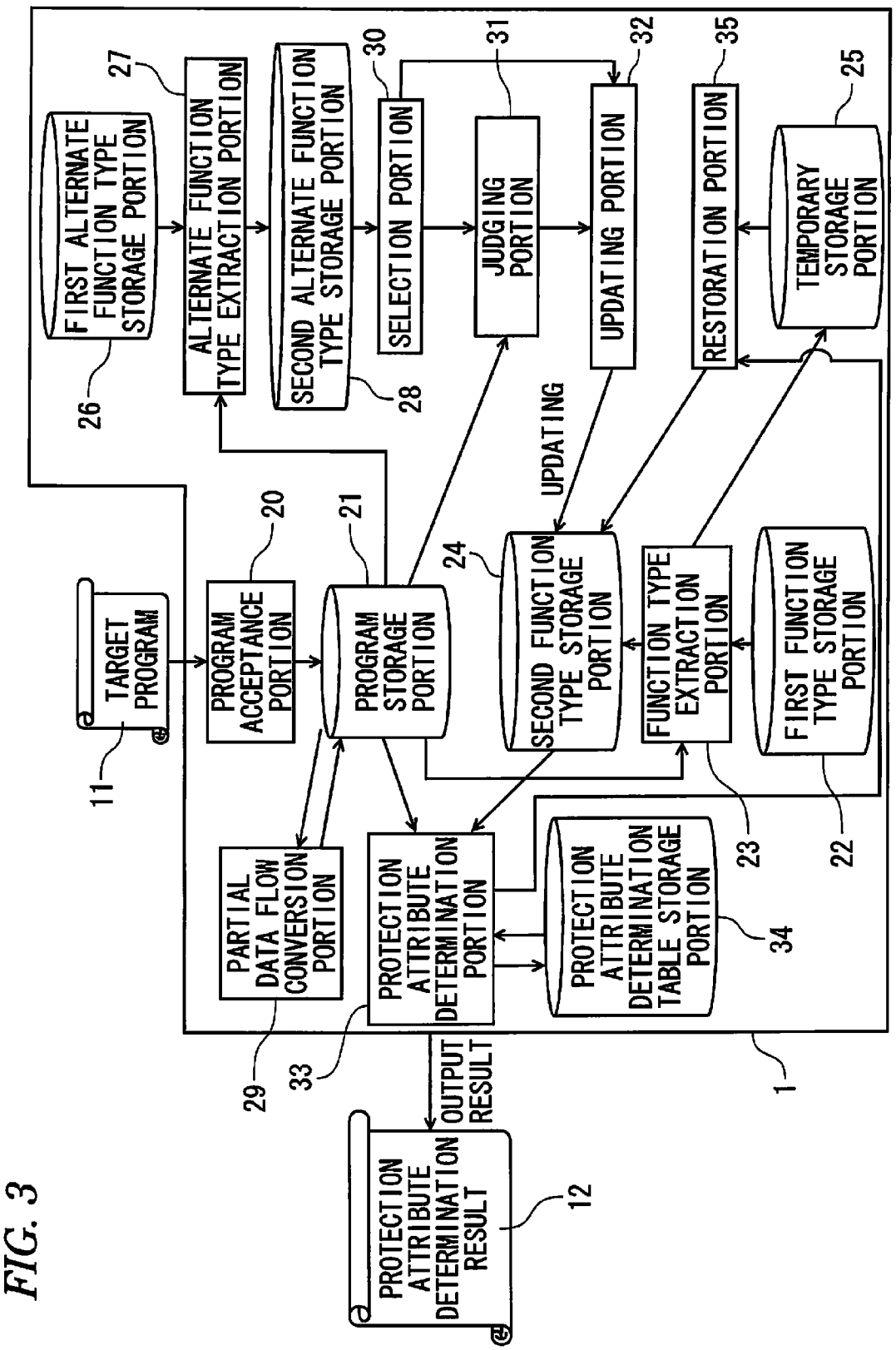
FIG. 3 illustrates a configuration of an information processing apparatus 1 according to the first embodiment.

FIG. 3 illustrates the configuration of the information processing apparatus 1 according to this embodiment. The information processing apparatus 1 has a program acceptance portion 20, a function type extraction portion 23, an alternate function type extraction portion 27, a partial data flow conversion portion 29, a selection portion 30, a judging portion 31, an updating portion 32, a protection attribute determination portion 33, a restoration portion 35, a program storage portion 21, a first function type storage portion 22, a second function type storage portion 24, a temporary storage portion 25, a first alternate function type storage portion 26, a second alternate function type storage portion 28, and a protection attribute determination table storage portion 34. These portions are generated on a storage device such as an RAM when the CPU executes a program. The information processing apparatus 1 takes (accepts) a target program 11 as input which is a program as a target (subject) of processing, and outputs a protection attribute determination result 12 with respect to each variable contained in the target program. Alternatively, protection attribute definition information may be stored in an external storage device (not shown) such as an HDD provided on the outside of the information processing apparatus 1.

The configuration of the information processing apparatus 1 will be described below in detail.

The program acceptance portion 20 accepts the target program 11 from the outside of the information processing apparatus 1. The program acceptance portion 20 stores the accepted target program 11 in the program storage portion 21 which will be described later. The target program 11 is information in which predetermined procedure with variables and functions are written. For example, the target program 11 is written in a human readable high-level language such as C language.

The program storage portion 21 stores the target program 11. The target program 11 and the partial data flow of the target program may be stored while they are associated with each other by the partial data flow conversion portion 29 which will be described later. FIG. 4 illustrates an example of the target program. FIG. 4 shows the target program executed by the system A 2201 in the protocol of FIG. 2. In FIG. 4, the second line shows variable declaration in which an (initial) protection attribute "confidential" is given. In the fourth and fifth lines, parameters (variables) are given. The seventh to eleventh lines show variable declaration of work variables. In the thirteenth to twentieth lines, a processing is written. Specifically, a random number "rA" is generated with a random number generation function "PhysicalRandom" in the thirteenth line and returned to the outside via the OS with an output function "Output" in the fourteenth line. An external input is taken to a buffer with an input function "Input" and saved as "buf" via the OS in the fifteenth line, and the size thereof is stored as "size". In the sixteenth line, the external input saved as "buf" is copied to a variable "rB". In the eighteenth line, "rA" and "rB" and a secret key "skA" for signature generation are input to a public key signature generation function "Sign2", so that a signature "sign" for "rA" and "rB" is returned. Finally, data is returned via the OS with an output function "Output" in the twentieth line, so that this processing is completed.

Although data types such as the number of fields, the length of each field, etc. for lots of variables are omitted from the target program in FIG. 4, definition of data types and coincidence thereof are required practically. However, because protection attributes and data types can be considered independently, the target program is written here while attention is paid to only protection attributes.

Although a protection attribute is given to a variable in the second line, protection attributes are not given to other variables. In this embodiment, a protection attribute is determined automatically for a variable to which no protection attribute has been given. Though not shown in the target program of FIG. 4, each constant (to which no protection attribute has been given) is a target of automatic protection attribute determination, too. Variables and constants will be hereinafter generically referred to as variables.

Protection attributes will be described here in detail. Protection attributes are classified by two properties, that is, integrity and confidentiality. Integrity means that information is correct and accurate, that is, the information is neither lacking nor falsified by an attacker. Confidentiality means that only a person having authority can access information but a person having no authority cannot read information. These are further classified by two kinds of viewpoints with respect to each of the security requirements of integrity and confidentiality as to whether data is protected on the memory area or not, and whether integrity or confidentiality of data is guaranteed or not. For example, even when the value of a certain variable is currently stored in a confidentiality protected memory area, the confidentiality of the value is not always guaranteed because there is a possibility that the value may be intercepted by an external entity such as the OS 301 when the value is stored in the non-protected memory if the value was stored in the non-protected memory area in the past or if the value will be stored in the non-protected memory area in the future. In this manner, protection attributes according to this embodiment are set so that on-memory non-protected (and non-guaranteed) property, on-memory protected but non-guaranteed (unconfirmed) property and on-memory protected and guaranteed (confirmed) property can be distinguished from one another with respect to each property of integrity and confidentiality.

In this embodiment, information indicating the protection attributes is referred to as protection attribute information. The protection attribute information is information indicating whether data put into a certain variable is stored in the protected memory area or in the non-protected memory area.

As for protection of the memory area, items to be achieved vary in accordance with protecting means such as access control, encryption, falsification verification, etc. For example, the protected memory area 215 having an access control mechanism which absolutely prohibits access from others than the program to be executed is provided so that both integrity and confidentiality are protected. However, when the whole of the memory area is disabled from being accessed by others than the program to be executed, input/output service provided by the OS 301 cannot be used at all. Therefore, as shown in FIG. 1, the non-protected memory area 214 is provided so that the integrity and confidentiality protecting mechanism for input/output is not achieved.

When protection of confidentiality is performed by a hardware encryption mechanism at the time of memory access, there may be a memory area in which confidentiality can be protected but integrity cannot be protected. When protection of integrity is performed by a hardware MAC (Message Authentication Code) generating and verifying mechanism, there may be a memory area in which integrity can be protected but confidentiality cannot be protected. It is a matter of course that a protecting mechanism having both integrity and confidentiality can be achieved in the same manner as access control when both memory areas are combined. In the configuration according to this embodiment, any one of these protecting means can be used.

The fact that information requiring integrity is carelessly stored in the non-protected memory area 214 and rewritten by others than the program to be executed is expressed as "information is tainted".

FIG. 5 illustrates protection attribute definition information 14 according to this embodiment. "Exposed" is a protection attribute indicating a variable of which a value is stored in the non-protected memory area where both integrity and confidentiality are non-protected, and a value does not have either integrity or confidentiality. When "exposed" is given, the OS 301 can perform input/output of program through a variable whose value can be read/written freely by the OS 301 and to which "exposed" is given. Although the protection attribute "exposed" is explicitly shown to clarify the difference from a protected variable in the following description, the protection attribute "exposed" may be omitted to keep compatibility with an existing program and avoid troublesomeness of description.

"Fixed" is a protection attribute indicating a variable of which a value is stored in the memory area where at least integrity is protected, and a value does not have either integrity or confidentiality. Because the value of the variable to which "fixed" is given is generally stored in the memory area where confidentiality is not protected, the OS can perform output of program through this variable. On the other hand, when a value is not referred by an external entity such as the OS, the value of the variable may be stored in the memory where confidentiality is protected.

"Verified" is a protection attribute indicating a variable of which a value is stored in the memory area where at least integrity is protected, and a value has integrity but does not have confidentiality. Because the value of the variable to which "verified" is given is generally stored in the memory area where confidentiality is not protected, the OS can perform output of program through this variable. On the other hand, when a value is not referred by an external entity such as the OS, the value of the variable may be stored in the memory where confidentiality is protected.

"Hidden" is a protection attribute indicating a variable of which a value is stored in the memory area where at least confidentiality is protected, and a value does not have either integrity or confidentiality. Because a variable to which "hidden" is given is not used for input from the outside so that the OS need not write any value into the variable, there is no problem even when the value of the variable is stored in the memory area having integrity protected.

"Concealed" is a protection attribute indicating a variable of which a value is stored in the memory area where at least confidentiality is protected, and a value has confidentiality but does not have integrity. Because a variable to which "concealed" is given is not used for input from the outside so that the OS need not write any value into the variable, there is no problem even when the value of the variable is stored in the memory area having integrity protected.

"Confidential" is a protection attribute indicating a variable of which a value is stored in the memory area where both integrity and confidentiality are protected, and a value has both integrity and confidentiality.

Symbols in "Integrity: Protected" and "Confidentiality: Protected" columns in FIG. 5 indicate whether the memory area where the value of a variable having each protection attribute given is stored has an integrity/confidentiality protecting function or not. The symbol "−" indicates that the memory area has no protecting function. The symbol "+" indicates that the memory area has a protecting function. The symbol "+/−" indicates that the memory area may have a protecting function or may have no protecting function. The symbol "−(+)" indicates that the memory area has no protecting function but may have a protecting function when a value is not referred by an external entity.

Moreover, symbols in "Integrity: Property" and "Confidentiality: Property" columns in FIG. 5 indicate whether each property of integrity and confidentiality of the value of a variable having each protection attribute given is guaranteed (confirmed) or not. The symbol "X" indicates that the property is not guaranteed. The symbol "O" indicates that the property is guaranteed.

Among six types of protection attributes described above, essentially important protection attributes are "exposed", "verified", "concealed" and "confidential". "Fixed" and "hidden" are auxiliary protection attributes.

Because the aforementioned protection attributes may be regarded as being substantially the same as the types (data types such as the number of fields, the length thereof, etc.) of variables in a general programming language, the same type of variables are allowed to be subjected to an arithmetic operation but different types of variables are not allowed to be subjected to an arithmetic operation. On the other hand, in data types in a general programming language, substitution with data type conversion (cast) may be possible to relax the restriction. That is, as represented by float x=(float)(int y), there is an operation in which the type of y in the int type (integer type) is converted into the float type (floating-point type) and then put into x. As will be described later, part of protection attributes are allowed to be subjected to substitution including protection attribute conversion. For such an operation, substitution including protection attribute conversion and data type conversion cannot be performed unless both a rule of protection attribute conversion and a rule of data type conversion are kept. An example in which the rule concerned with data types and the rule concerned with protection attributes can be checked independently is considered in this embodiment, so that description will be made below while attention is paid only to protection attributes.

The first function type storage portion 22 stores function type information which is information of function types. That is, the first function type storage portion 22 stores security function type information which is information of function types of security functions and non-security function type information which is information of function types of non-security functions.

The term "function" means a set of instructions that performs a specific task in a program. For example, the term "function" includes a procedure generally called "subroutine".

Specifically, the first function type storage portion 22 stores first function type information by which information of at least one or more security function types are directly or indirectly associated with identification information of each security function.

The security function type information has protection attribute information which indicates whether data put into each input variable and each output variable of a security function are stored in the protected memory area or stored in the non-protected memory area.

In addition, there may be stored second function type information by which information of at least one or more non-security function types having protection attribute information indicating whether data put into each input variable and each output variable of a non-security function are stored in the protected memory area or stored in the non-protected memory area are directly or indirectly associated with identification information of each non-security function.

In this embodiment, functions are classified into security functions and non-security functions. The term "security function" means a function having a computational one-wayness property (there is a subset in a whole set of input/output variables such that it is impossible in realistic time to calculate the value of a variable not belonging to the subset from the value of a variable belonging to the subset), a function which performs verification processing for integrity of the value of an input variable, or a function in which an input variable and an output variable can take different protection attributes.

On the other hand, the term "non-security function" means a function in which all input and output variables take the same protection attribute. The protection attribute allowed to be taken by each input/output variable is defined by the function type.

The function type of each security function is defined based on whether the function performs a process having a computational one-wayness property (there is a subset in a whole set of input/output variables such that it is impossible in realistic time to calculate the value of a variable not belonging to the subset from the value of a variable belonging to the subset), whether the function performs verification processing for integrity of the value of an input variable, or whether the function performs allowed (secure) protection attribute conversion. For example, with respect to confidentiality, if a function y=f(x) has such a computational one-wayness property that it is impossible in realistic time to calculate the value of input x from the value of output y, this function is a security function because it is possible to allow a protection attribute in which confidentiality of the input x is guaranteed and confidentiality of the output y is not guaranteed. With respect to integrity, if the function performs verification such as signature verification as to whether the value of an input has integrity or not, and outputs the verified value (the value itself being the same as the input value), this function is a security function because it is possible to allow a protection attribute in which integrity of the input is not guaranteed but integrity of the output is guaranteed.

On the other hand, if the function does not have computational one-wayness property, it is impossible to allow a protection attribute in which confidentiality of the input is guaranteed but confidentiality of the output is not guaranteed because, for example, the input can be calculated from the output. If the function has no verification process as to whether the input has integrity or not, it is impossible to allow a protection attribute in which integrity of the input is not guaranteed but integrity of the output is guaranteed. As a result, a function which does not have any one of the aforementioned properties so that the protection attributes of the input and the output must be the same is a non-security function.

By controlling the storage area of data put into a variable in a program based on the protection attribute defined based on the function type, data put into an input variable in a security function and data put into an output variable in the security function can be protected appropriately.

The security function type information has protection attribute information of each variable in a security function. The non-security function type information has protection attribute information of each variable in a non-security function.

As an example of the security function, there can be used a function which achieves basic components (cryptographic primitives) based on a cryptographic method and which is used in a program providing an information security mechanism such as data confidentiality (privacy) protection, data integrity check/protection, entity authentication, data authentication, etc. Examples of cryptographic primitives include a hash function, a one-way function, a random number generation function, a common key encryption, a MAC (Message Authentication Code), a public key encryption, a public key signature, etc. Although each of the hash function, the one-way function and the random number generation function can be achieved by one security function, each of the common key encryption and the public key encryption can be achieved by three security functions (a key generation function, an encryption function and a decryption function). Moreover, each of the MAC and the public key signature can be achieved by three functions (a key generation function, an MAC/signature generation function and an MAC/signature verification function). These functions are functions each of which has a computational one-wayness property between an input variable and an output variable or performs verification of integrity.

Figure 6A:
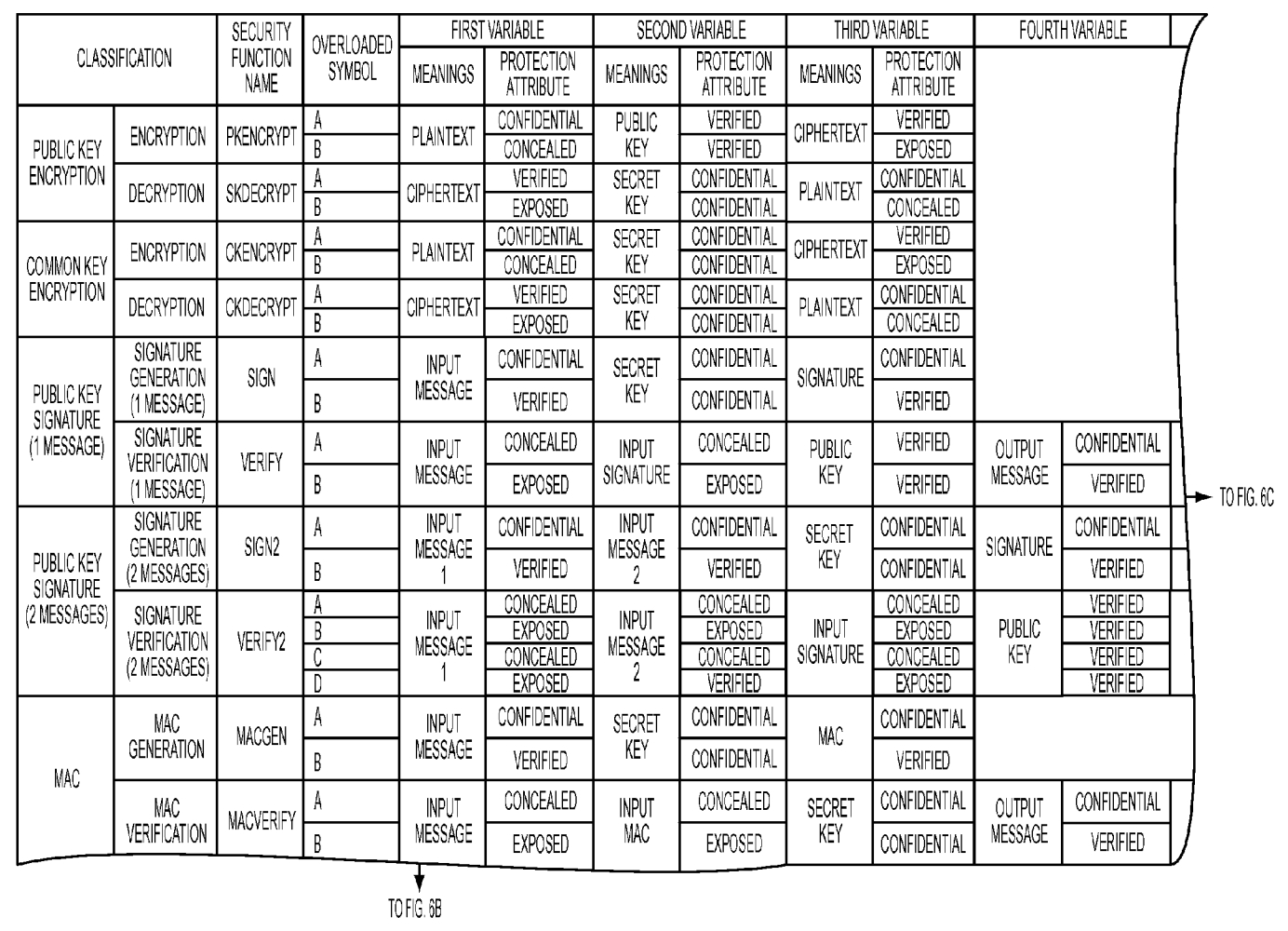
Figure 6B:
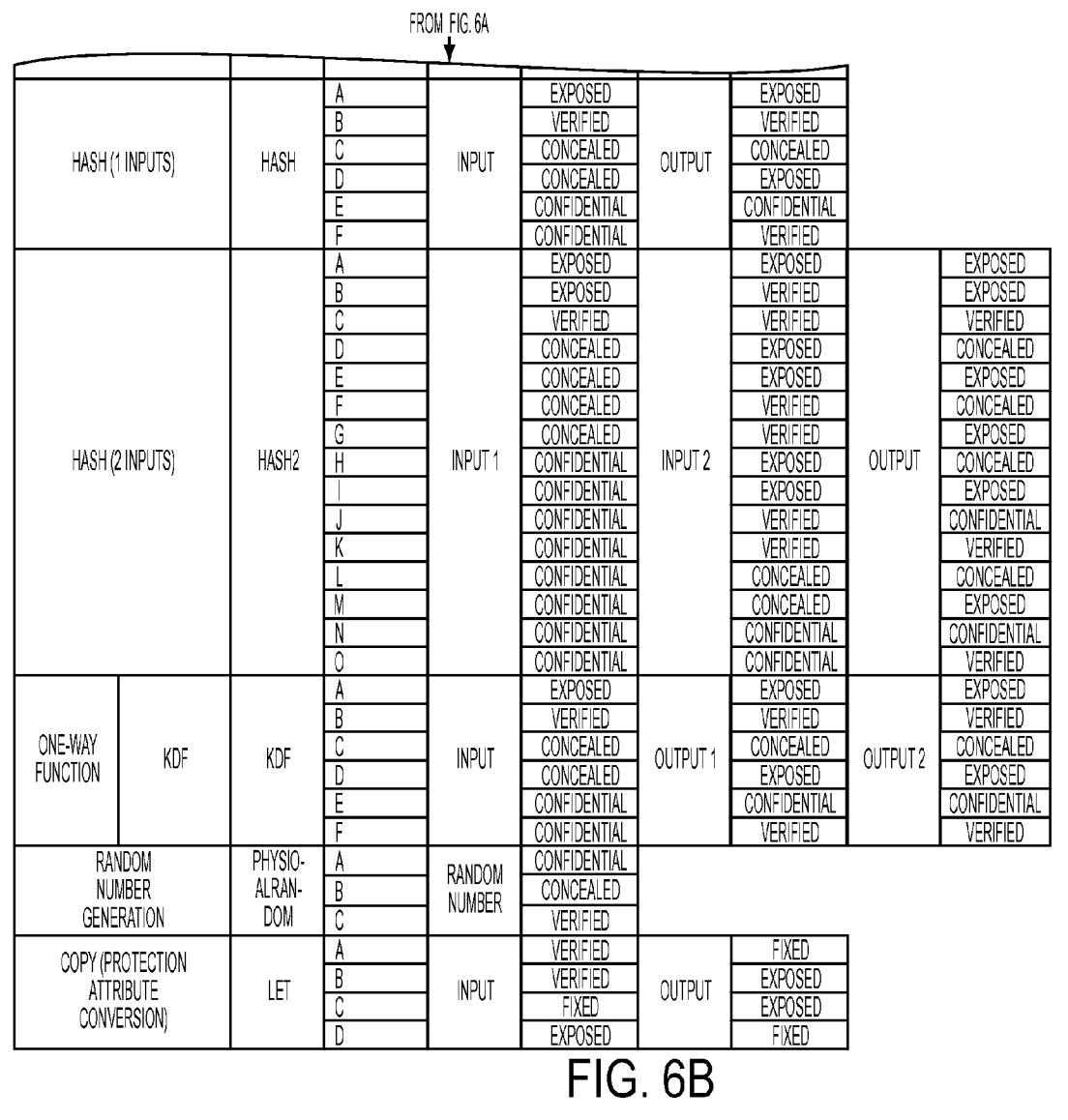
Figure 6C:
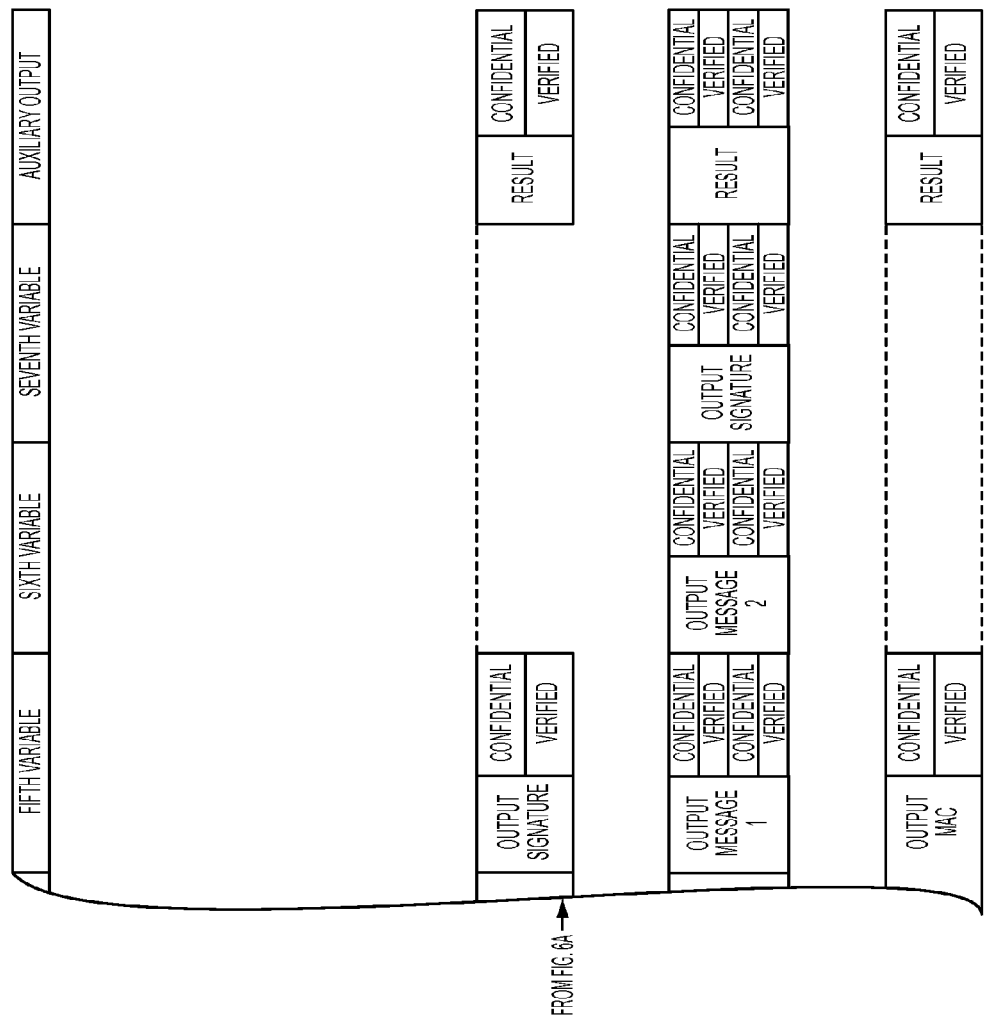
FIG. 6 illustrates function type information of each security function according to the first embodiment.

FIG. 6 illustrates function type information defined in accordance with each security function. An encryption function and a decryption function in public key encryption, an encryption function and a decryption function in common key encryption, a signature generation function and a signature verification function in public key signature (one input message or two input messages), an MAC generation function and an MAC verification function in MAC, a hash function (1-input 2-outputs or 2-inputs 1-output), a KDF (key derivation function) as a kind of one-way function, a random number generation function, and a copy function for protection attribute conversion are shown as security functions. The security functions in the embodiment etc. correspond to first functions in the scope of claim. The security function type information in this embodiment etc. corresponds to first function type information in the scope of claim.

For security function information, each input/output of the function is associated with a specific protection attribute of an input/output variable. The input/output variable is a variable actually taken as an input/output in a function, that is, a variable into which a value to be taken into a function is put or a variable into which a value to be returned from a function is put. The protection attribute of each input/output variable is defined based on whether the security function has a computational one-wayness property or not, or whether the function performs a process of verifying integrity of the value of the input variable or not. The output of a function includes the case where the output is used as the form of a variable such as "func(input, output)", and the case where the output is used as a value such as "output=func(input)" returned from the function. For example, as for an encryption function in public key encryption in FIG. 6, the security function name (identification information of the security function) is PKEncrypt and the function takes three input/output variables, that is, a first variable, a second variable and a third variable, as input/output. As for the meanings of the variables, the first variable is a plaintext (a message to be encrypted, input), the second variable is a public key (input), and the third variable is a ciphertext (encrypted message, output). Each line expresses one function type. Two types of overloaded definitions with overloaded definition symbols A and B are defined as function types of the encryption function in public key encryption. This means that either of the function types is used in accordance with the situation where the encryption function is used. Such definition of two or more function types for one security function is referred to as overloaded definition (of function types). The two function types are designed based on the following idea.

First, the public key must be stored in a memory area having no confidentiality so that any one can access the public key, and integrity of the public key must be guaranteed so that public key encryption can be performed correctly. Accordingly, in either definition A or B, the protection attribute of the public key must be "verified".

On the other hand, confidentiality of the plaintext to be encrypted must be guaranteed to prevent the plaintext from being intercepted by an external entity, but integrity of the plaintext is arbitrary. Accordingly, the protection attribute of the plaintext in A is "confidential" showing the case where both confidentiality and integrity are guaranteed, and the protection attribute of the plaintext in B is "concealed" showing the case where only confidentiality is guaranteed.

Finally, it is unnecessary to protect confidentiality of the ciphertext because the ciphertext is encrypted. This can be found from the computational one-wayness property of the encryption function. That is, because it is easy to calculate a ciphertext from a plaintext but it is impossible to calculate a plaintext from a ciphertext in a realistic time, it is unnecessary to store the ciphertext in the confidentiality protected memory. With respect to integrity of a ciphertext, A is "verified" so that only integrity thereof is guaranteed but B is "exposed" so that both integrity and confidentiality are non-guaranteed because integrity of the ciphertext takes over from integrity of the plaintext directly.

Other security functions in FIG. 6 will be described. A decryption function SKDecrypt in public key encryption takes a ciphertext and a secret key as inputs and outputs a plaintext. The secret key must be "confidential" so that both integrity and confidentiality are guaranteed. Because confidentiality of the plaintext must be guaranteed and integrity of the plaintext takes over from integrity of the ciphertext, the ciphertext is "verified" and the plaintext is "confidential", or the ciphertext is "exposed" and the plaintext is "concealed".

An encryption function CKEncrypt in common key encryption takes a plaintext and a secret key as inputs and generates a ciphertext. A decryption function CKDecrypt takes a ciphertext and a secret key as inputs and generates a plaintext. The function types of CKEncrypt and CKDecrypt are substantially the same as the function types of PKEncrypt and SKDecrypt respectively. The difference is in that the protection attribute of the second variable as an input of CKEncrypt must be not "verified" but "confidential" because the key for encryption is not a public key but a secret key.

A signature generation function (1 message) Sign in public key signature (1 message) and a signature generation function (2 messages) Sign2 in public key signature (2 messages) take one or two input messages to be signed and a secret key as inputs and generates a signature. Integrity of each input message must be guaranteed but confidentiality thereof is arbitrary. Both integrity and confidentiality of the secret key must be guaranteed. Confidentiality and integrity of the signature take over from confidentiality and integrity of the input message(s) directly. An MAC generation function MACGen in MAC takes an input message and a secret key as inputs and generates an MAC. The function type of MACGen is substantially the same as the function type of Sign. The difference is in that the protection attribute of the second variable as an input of MACGen must be not "verified" but "confidential" because the key for MAC generation is not a public key but a secret key.

A signature verification function (1 message) Verify in public key signature (1 message) takes an input message to be signed, an input signature for the input message and a public key for signature verification as inputs and outputs a verified output message, a verified output signature and a verification result (auxiliary output) indicating whether verification succeeded (a pair of input message and input signature is valid) or not. In general signature verification, only a verification result indicating whether verification succeeded or not, is returned. In signature verification according to this embodiment, however, variables for an output message and an output signature are prepared so that the same values as those of the (verified) input message and the input signature are stored in the variables for the output message and the output signature only when signature verification succeeded.

As for the function type, because integrity of a public key must be guaranteed and the public key must be stored in a non-security memory area so that any one can access the public key, the protection attribute thereof is "verified". Integrity of each of the input message and the input signature is non-guaranteed but confidentiality thereof is arbitrary. When the output message and the output signature are returned, integrity is guaranteed because verification succeeded. Confidentiality takes over from that of each of the input message and the input signature. When none of the inputs has confidentiality, confidentiality of the verification result is not guaranteed because any one can calculate the verification result.

When any one of the inputs has confidentiality, confidentiality of the verification result is guaranteed.

When function types are defined as described above, the output message and the output signature having integrity after signature verification (i.e. having the same values as those of the input message and the input signature) can be used so as to be separate in terms of security from the input message and the input signature having no integrity before signature verification. For example, it is possible to remove such an error that a verified variable returned from signature verification should be taken into an input of a security function taking as an input a variable into which a value having integrity is put, but a non-verified variable (whose value may be falsified after execution of the signature verification function) is taken by mistake.

The function type of a signature verification function (2 messages) Verify2 in public key signature (2 messages) is the same as that of Verify except two input messages and two output messages are provided. However, overloaded definitions C and D show the case where an input message 1 has not been verified yet but an input message 2 has been already verified. An MAC verification function MACVerify in MAC takes an input message for which MAC is generated MAC, an MAC for the input message and a secret key for verification as inputs and outputs a verified output message, a verified MAC and a verification result (auxiliary output) indicating whether verification succeeded (a pair of input message and input MAC is valid) or not. The function type of MACVerify is substantially the same as that of Verify. The difference is in that the protection attribute of the second variable as an input of MACVerify must be not "verified" but "confidential" because the key for MAC verification is not a public key but a secret key.

Hash functions Hash and Hash2 are functions each of which calculates a value called hash value from given input. Hash has one input. Hash2 has two inputs. Integrity and confidentiality of the function type are determined based on the following idea. As for integrity, (i1) all the inputs have integrity and the output has integrity, or (i2) at least one of the inputs does not have integrity and the output does not have integrity. As for confidentiality, (c1) none of the inputs has confidentiality and the output does not have confidentiality, (c2) at least one of the inputs has confidentiality and the output has confidentiality, or (c3) at least one of the inputs has confidentiality and the output does not have confidentiality. The function which can be defined by (c3) is a hash function having a computational one-wayness property because all the inputs cannot be calculated from a hash value as an output.

In the function type definitions in FIG. 6, the overloaded definition A of a 1-input 1-output hash function Hash is defined as a combination of (i2) and (c1). Similarly, B is defined as a combination of (i1) and (c1), C is defined as a combination of (i2) and (c2), D is defined as a combination of (i2) and (c3), E is defined as a combination of (i1) and (c2), and F is defined as a combination of (i1) and (c3). Overloaded definitions of a 2-input 2-output hash function Hash2 are defined in the same manner.

A key derivation function KDF is a function which generates two outputs from one input and which is used when two or more key data sufficiently long in data length are generated from an input (shorter than output). Because the function has a one-wayness property, the definition of the function type is substantially the same as that of the hash function Hash. The difference lies in that two outputs are provided and the protection attributes of the two outputs are the same.

A random number generation function PhysicalRandom is a function which generates a random number and which takes no input. Three types of random numbers, that is, a random number having only integrity, a random number having only confidentiality and a random number having both integrity and confidentiality are defined as protection attributes of output random numbers. The generated random number generally always has integrity but a random number having only confidentiality is defined for convenience' sake to prepare a random number for calculation with a value having only confidentiality.

Finally, a copy function for protection attribute conversion is a function which copies (puts) a value of an input variable into an output variable. This function is prepared as a security function for convenience' sake in accordance with the protection attribute definitions in this embodiment. A value of a variable to which each protection attribute "hidden", "concealed" or "confidential" is given cannot be put into a variable to which another protection attribute is given. Although a value of a variable to which a protection attribute "verified" is given can be allowed to be put into a variable to which "fixed" or "exposed" is given, a value of a variable to which a protection attribute "fixed" or "exposed" is given cannot be put into a variable to which a protection attribute "verified" is given (because integrity of the value of the variable to which "fixed" or "exposed" is given is not guaranteed). A value of a variable to which a protection attribute "fixed" is given can be put into a variable to which "exposed" is given, and vice versa. Putting a value of a variable to which "exposed" is given into a variable to which "fixed" is given may be used as a method in which a value of a variable which is an input of a program and to which "exposed" is given is copied to a variable to which "fixed" is given so that the value of the variable which is the input of the program can be prevented from being then falsified by an external entity.

Development of security functions, that is, definition of function types and implementation of security functions must be performed more carefully than development of general application programs. FIG. 7 illustrates a work flow for development of security functions and application programs. The function types and implementation of security functions are developed by an expert programmer which is a security specialist having a good knowledge of both memory managements for a cryptographic primitive and a program (501). It is necessary to pay sufficient attention not only to whether operations of the security functions are correct or not, but also to whether protection attributes thereof are defined appropriately or not. Then, the function type of each security function implemented securely such as a proper protection attribute is given to a variable inside the security function by the security specialist are used so that a security protocol using the security function is implemented by a general programmer (502).

Although the function type of each security function shown in FIG. 6 is defined based on general security requirement, the function type of the security function varies according to an encryption algorithm etc. used in a target program. In this case, addition/deletion of security functions and change in security function type definition by the security specialist are required.

Figure 8:
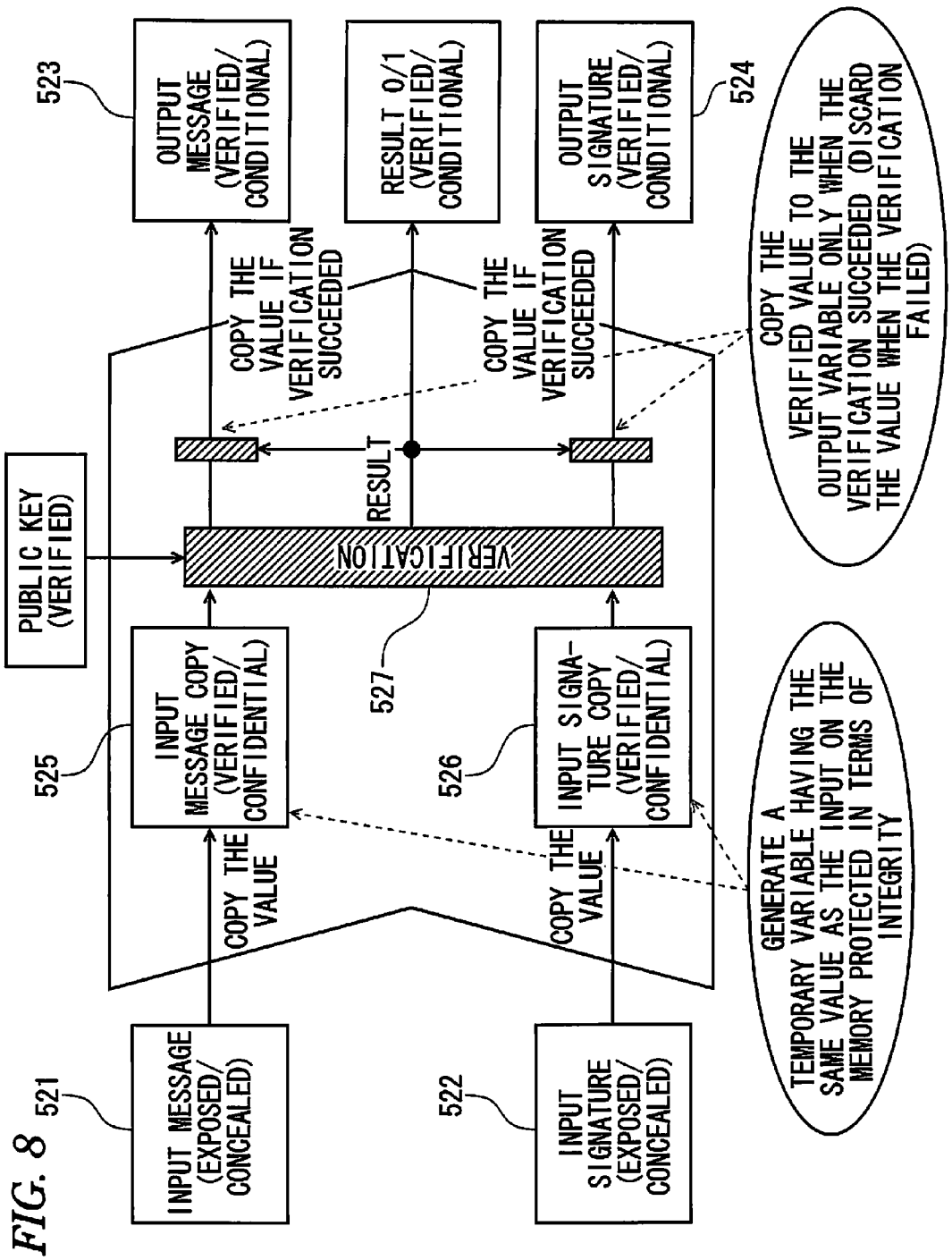
FIG. 8 illustrates a signature verification function according to the first embodiment.

As for implementation of each security function in FIG. 7, it is particularly necessary to pay attention to the signature verification function and the MAC verification function. FIG. 8 conceptually illustrates a signature verification and implementation thereof in this embodiment. As described above, in signature verification in this embodiment, an output message variable 523 and an output signature variable 524 corresponding to an input message variable 521 and an input signature variable 522 respectively in a signature verification function are prepared so that the same values as those of the (verified)

input message and input signature are put into the output message and output signature variables respectively when signature verification succeeded. In FIG. 8 showing an implementation example of this function, first, an input message temporary variable 525 and an input signature temporary variable 526 are generated and the values of the input message variable 521 and the input signature variable 522 are copied to the temporary variables 525 and 526 respectively. On this occasion, the values of the temporary variables are never falsified after copying because the values of the temporary variables are stored in an integrity protection memory. After the values of the temporary variables are protected so as not to be falsified, the values of the temporary variables are verified (527). Only when verification succeeded, the values of the temporary variables 525 and 526 for input message and input signature are copied to the variables 523 and 524 for output message and output signature respectively.

This implementation is effective in preventing an attacker from rewriting the values of the non-verified variables during verification. For example, if implementation is performed so that the values of the variables 521 and 522 for input message and input signature are copied to the variables 523 and 524 for output message and output signature respectively when verification 527 succeeded, an attacker may falsify the values of the variables 521 and 522 for input message and input signature during copying after verification 527. As a result, the signature verification function outputs the values falsified by the attacker as verified values. According to implementation shown in FIG. 8, falsification in a period of from start of verification to copying of the value of the output variables can be prevented so that such vulnerability can be eliminated. The MAC verification function outputs a variable into which the same value as the input is put only when verification succeeded, in the same manner as the signature verification function.

FIG. 9 illustrates the function types of an input function "Input" and an output function "Output" which are non-security functions in this embodiment. As for the function type of each non-security function, all protection attributes of variables are identical with each other. Because a variable (input variable) taken into the function "Input" is written by the OS, the input variable is limited to a variable to which a protection attribute "exposed" is given. The output is also limited to a variable to which a protection attribute "exposed" is given. However, because "exposed" and "fixed" can be converted to each other as described above, the external input may be fetched in the "exposed" memory area and copied to the "fixed" memory area having a falsification protecting mechanism. Moreover, because values of the variables (output variables) returned from the function "Output" need not to be written by the OS, protection attributes of the variables are overloaded as all "exposed" or all "verified".

Each non-security function in this embodiment corresponds to a second function in the scope of Claims. Non-security function type information in this embodiment corresponds to second function type information.

All functions whose function types are not defined are regarded as non-security functions and overloaded as "all protection attributes of input/output variables are the same and may be any one". That is, the functions are regarded as overloaded as protection attributes of input/output variables must be any one of all "confidential", all "concealed", all "verified", all "hidden", all "fixed" and all "exposed".

The function type extraction portion 23 extracts real security function type information which is security function type information corresponding to real security function information, based on first function type information stored in the first function type storage portion 22 and the real security function information which is information of a security function included in the target program.

For example, the function type extraction portion 23 extracts security function type information of a security function in which identification information of a security function included in the first function type information coincides with identification information of a security function included in the real security function information.

Then, the function type extraction portion 23 writes the extracted first real function type information into the second function type storage portion 24 and the temporary storage portion 25 which will be described later.

Each real security function in this embodiment etc. corresponds to a first real function in the scope of Claims. The real security function type information in this embodiment corresponds to first real function type information.

Alternatively, the function type extraction portion 23 may extract real non-security function type information which is non-security function type information corresponding to real non-security function information from second function type information, based on second function type information stored in the first function type storage portion 22 and the real non-security function information which is information of a non-security function included in the target program, and may write the extracted second real function type information into the second function type storage portion 24 and the temporary storage portion 25 which will be described later.

Each real non-security function in this embodiment etc. corresponds to a second real function in the scope of Claims. Real non-security function type information in this embodiment etc. corresponds to second real function type information in the scope of Claims.

When a function in which a function type corresponding to the first function type storage portion is not defined is present in the target program, the function type extraction portion 23 may regard the function type of the function as overloaded as "all protection attributes of input/output variables are the same and may be any one" and may extract (generate) corresponding real non-security function type information.

The second function type storage portion 24 stores the real function type information extracted by the function type extraction portion 23.

The real function type information is information indicating correspondence of identification information of a function and identification information of a real function (information for distinguishing plural function calls of the same function).

Function type information in accordance with each real function for the target program shown in FIG. 4 is shown in FIG. 10 as an example of information (real function type information) of a function type in accordance with each real function in security functions and non-security functions stored in the second function type storage portion 24. In the example of FIG. 10, real security function type information which is real function type information of a security function is information which indicates correspondence of a real security function name determined based on a security function name as identification information of a security function and a code (which will be described later in detail) as identification information of a real function, an overloaded definition symbol and a protection attribute corresponding to the overloaded definition symbol in accordance with the meanings of each variable. Real non-security function type information which is real function type information of a non-security function is information which indicates correspondence of a real non-security function name determined based on a non-security function name as identification information of a non-security function and a code as identification information of a real function, an overloaded definition symbol and a protection attribute corresponding to the overloaded definition symbol in accordance with the meanings of each variable.

In real function type information, a security function and a non-security function are distinguished in accordance with each call, converted into "#code_function name" based on a code varying in accordance with the call as represented by a real security function name and a real non-security function name in FIG. 10, and stored in the form of "#code_function name". This is for the purpose of extracting a function type in accordance with each real function, that is, in accordance with each function call, and distinguishing the function type of each function call. In this example, a number given to each function in FIG. 2 is used as the code.

In this example, function types of a random number generation function "PhysicalRandom" and a signature generation function (2 messages) "Sign2" as security functions and an input function "Input" and an output function "Output" as non-security functions in accordance with real functions are extracted. Particularly, because the output function "Output" is called twice in the target program shown in FIG. 4, the function calls are distinguished from each other as "#2402_Output" and "#2403_Output".

The temporary storage portion 25 stores real function type information extracted by the function type extraction portion 23. Although the temporary storage portion 25 has a capacity enough to store real security function type information, real non-security function type information may be stored in the temporary storage portion 25.

In this embodiment, protection attributes of variables in a program are determined to satisfy restriction of function types (protection attributes of variables) in the aforementioned security function and non-security function to thereby prevent variables having different protection attributes from being processed in the non-security function to guarantee that such processing is performed safely only in the security function.

The first alternate function type storage portion 26 stores alternate function type information by which specific procedure information indicating a specific processing using a security function is associated with information of at least one or more function types. The function type information included in the alternate function type information is information of a security function which can be substituted for function type information of a security function executed in a specific procedure when the specific procedure is executed. The function type information has identification information of the security function.

The alternate function type extraction portion 27 extracts alternate function type information and alternate real function type information corresponding to real security function information based on the real security function information.

For example, alternate function type information in which identification information of a security function included in specific procedure information associated with an alternate function type stored in the first alternate function type storage portion 26 coincides with identification information of a security function included in real security function information included in second function type information stored in the second function type storage portion 24 is extracted from the first alternate function type storage portion 26.

That is, alternate real function type information (corresponding to second alternate function type information described in the scope of Claims) composed of a pair of specific procedure information and real function type information is extracted in accordance with each real security function included in the target program stored in the program storage portion 21, and the extracted information is stored (written) in the second alternate function type storage portion 28.

Figure 11B:
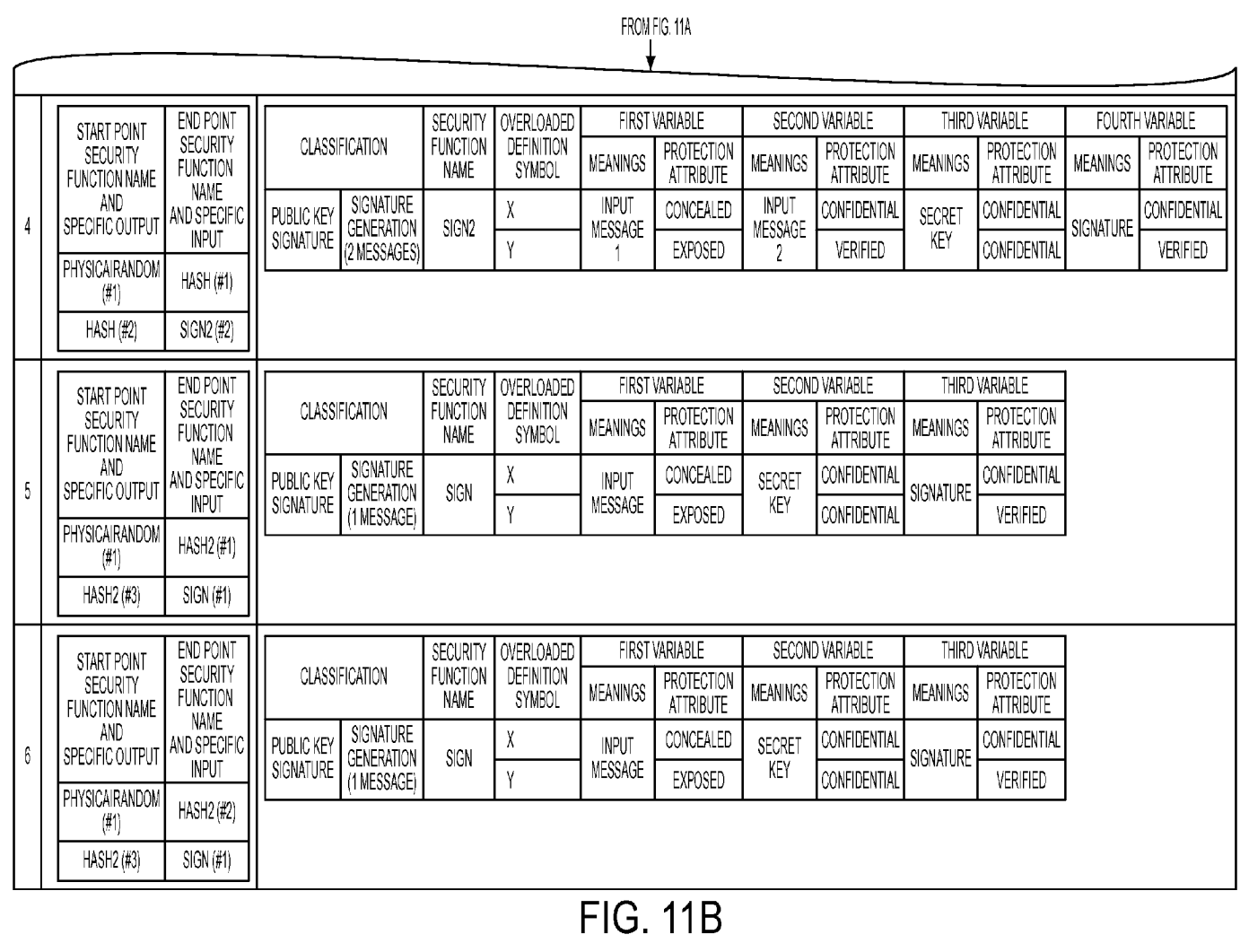

FIG. 11 illustrates alternate function type information (information associated with specific procedure information and function type information) according to the embodiment. The alternate function type information indicates that only when a specific processing defined in terms of the relations of input/output of functions in specific procedure information designated by the first column in each line (number) is present in the program, function type information about a security function designated by the second column can be used as a substitute for the function type information of the security function included in the specific procedure. The alternate function type information is defined in accordance with each security function like the function type information (first function type information) defined in accordance with each function. By using the alternate function type information, protection attribute determination can be performed in consideration of input/output relation between functions when a protection attribute of a variable in the program cannot be determined by a function type having a protection attribute defined in consideration of only a single function.

The specific procedure information is a set of at least one or more combinations of a start point security function name and a specific output of the function, and an end point security function name and a specific input of the function. In this embodiment, the specific input or specific output of a function is designated in the form of "function name_(#input/output identification number)" by using the function name and the input/output identification number of the function. Each combination means that the specific output of the start point security function is taken to the specific input of the end point security function. For example, No. 1 in FIG. 11 means a specific procedure in which a first variable (random number) returned from a random number generation function "PhysicalRandom" defined in FIG. 6 is taken as a first variable (input message 1) of a signature generation function (2 messages) "Sign2" defined also in FIG. 6 because the specific input of the start point security function is "#PhysicalRandom(#1)" and the specific output of the end point security function is "#Sign2(#1)". That is, (the specific procedure of) No. 1 means that an output value (random number) of a random number generation function is taken as an input message 1 of a signature generation function.

Function type information associated with alternate function type information is defined in the same format as that of function type information shown in FIG. 6, and the function type information indicates a function type which can be used (substituted) only when the corresponding specific procedure is present in a program. For example, (the function type of) No. 1 in FIG. 11 shows a function type which can be substituted for the function type of the signature generation function (2 messages) "Sign2" (only when of the corresponding specific procedure, that is PhysicalRandom(#1) is taken to Sign2(#1), is present). In the ordinary function type of Sign2, as shown in FIG. 6, no variable but a variable ("confidential" or "verified") having integrity can be allowed as an input message 2 of a second variable. However, in the function type of No. 1 in FIG. 11, a value not having integrity is allowed to be taken as a second variable because the protection attribute of message 2 of the second variable is "concealed" or "exposed".

Alternate function type information of No. 1 in FIG. 11 can be regarded as "signature generation is allowed regardless of the second variable of "Sign2" not having integrity only when the first variable of the signature generation function (2 messages) "Sign2" is a variable having as a value a random number generated by the random number generation function "PhysicalRandom".

Meanings of definition will be described here. In the viewpoint of security, all messages to be signed must have integrity as represented by the definition shown in FIG. 6. However, in a protocol called challenge-and-response protocol, a signature is given to a temporarily used message which does not have special meaning to thereby perform authentication. That is, a "random number" is inserted into a part of a message to make the message to be signed not having special meaning to thereby prevent the signed message from being abused.

When the challenge-and-response protocol is considered based on the aforementioned idea, it can be conceived the condition for a message to be signed is in that all have integrity or all do not have integrity but partially include a random number having integrity. Because there is a possibility that an external input may be falsified and integrity of the external input cannot be guaranteed, it is impossible to judge whether the external input is a random number or not. On the other hand, it is believed that a random number generated in the target system and stored in integrity protected memory is truly random within the target system.

In other words, when a value generated by the random number generation function is taken to a signature input, signature generation can be allowed. That is, only when the aforementioned specific procedure (in the aforementioned example, such a processing that an output of a random number generation function is taken to an input of a signature generation function) is satisfied, alternate function type information of a security function for generating a signature even when a value having no integrity is included in the input can be used. By considering such alternate function type information, determination of a protection attribute in consideration of the specific procedure can be performed.

Refer back to FIG. 11. Definition No. 2 is almost the same as definition No. 1 except that a specific input and the variable which may not have integrity are Sign2(#2) and Sign(#1) respectively.

Each of definition Nos. 3 to 6 has two combinations where each combination has a start point security function name and a specific output, and an end point security function name and a specific input. When plural combinations are provided as described above, those must be entirely satisfied.

Definition No. 3 defines that such a function type that a second variable of a signature generation function (2 messages) "Sign2" may not have integrity (though integrity thereof is necessary in the function type shown in FIG. 6) can be used as long as there is a specific procedure in which a first variable returned from a random number generation function "PhysicalRandom" is taken as a first variable of a hash function (1 input) "Hash" and a second variable returned from the hash function is taken as a first variable of the signature generation function (2 messages) "Sign2". Definition No. 4 is almost the same as definition No. 3 except that the specific input and the variable which may not have integrity are Sign2 (#2) and Sign2(#1) respectively.

Definition No. 5 defines that such a function type that an input as a first variable of a signature generation function "Sign" may not have integrity (though integrity thereof is necessary in the function type shown in FIG. 6) can be used as long as there is a specific procedure in which a first variable returned from a random number generation function "PhysicalRandom" is taken as a first variable of a hash function (2 inputs) "Hash2" and a third variable returned from the hash function is taken as a first variable of the signature generation function (1 message) "Sign". Definition No. 6 is almost the same as definition 5 except that a specific input and the variable which may not have integrity are Hash2(#2) and Hash2(#1) respectively.

Figure 12:
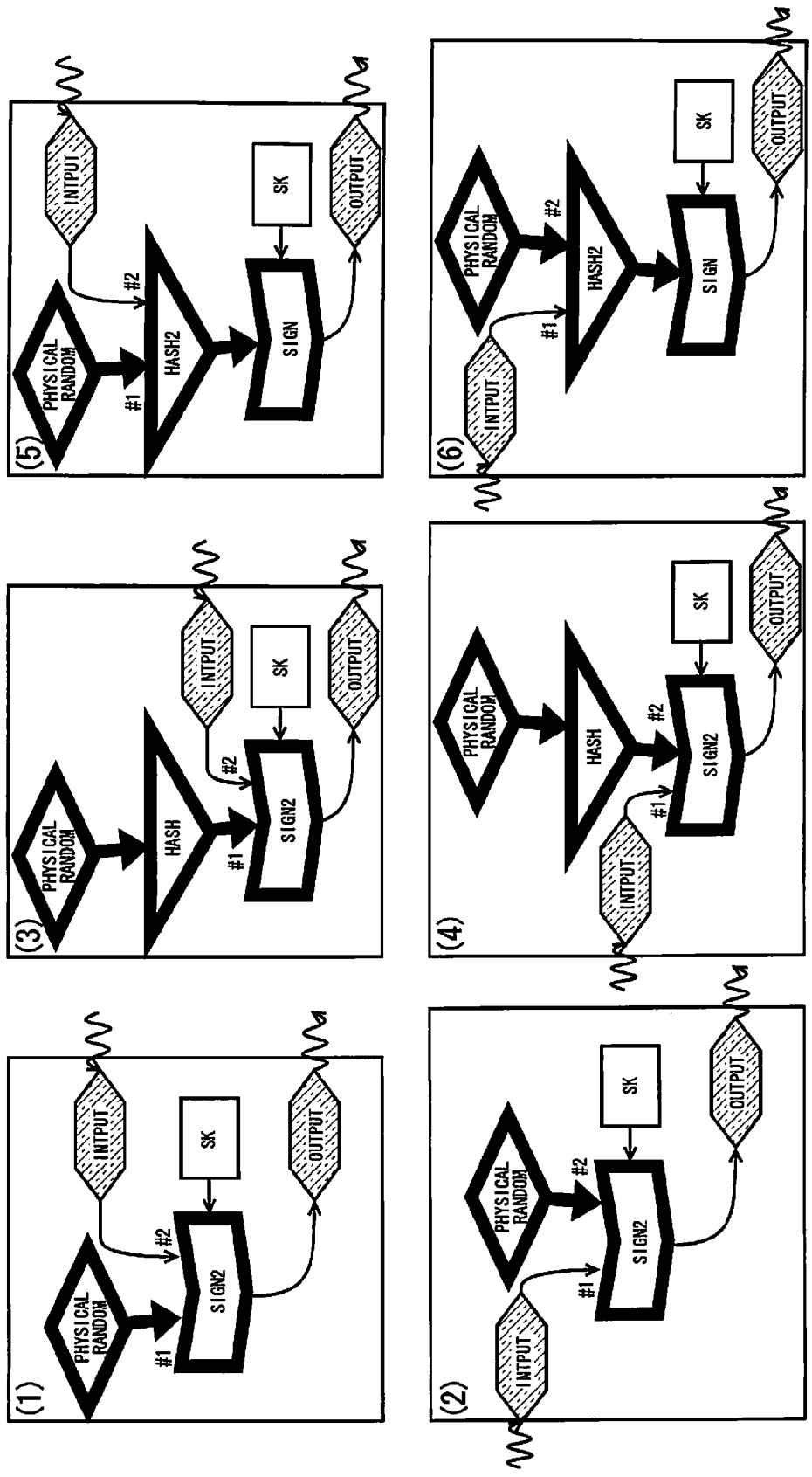
FIG. 12 illustrates a data flow of the specific procedure according to the first embodiment.

FIG. 12 shows an example of a data flow including a specific procedure defined in FIG. 11. Respective numerals put in parentheses in FIG. 12 correspond to Nos. in FIG. 11. Numerals following # in FIG. 12 show input/output identification Nos. of a function (e.g. #1 shows a first input/output (variable) of the function). Each part drawn by the bold line in FIG. 12 shows a specific procedure defined in FIG. 11.

The second alternate function type storage portion 28 stores alternate real function type information extracted by the alternate function type extraction portion 27.

As an example of alternate real function type information stored in the second alternate function type storage portion 28, alternate real function type information for the target program shown in FIG. 4 is shown in FIG. 13. In this example, Nos. 1 and 2 of alternate function type information in FIG. 11 are extracted while associated with real security functions "#2211_PhysicalRandom" and "#2214_Sign2" in the target program shown in FIG. 4, and stored in the second alternate function type storage portion 28.

Because alternate real function type information stored in the second alternate function type storage portion 28 is extracted for each real function (each function call) of security function, the security function name in specific procedure information and function type information is a real security function name which is determined based on a security function name as identification information of a security function and a code as identification information of a real function. Moreover, on this occasion, alternate real function type information stored in the second alternate function type storage portion 28 and real function type information stored in the second function type storage portion 24 give the same code to the same real security function. Therefore, the code of the random number generation function "PhysicalRandom" is 2211 and the code of the signature generation function (2 inputs) "Sign2" is 2214, like the codes shown in FIG. 10.

Pay attention to the fact that alternate real function type information is extracted for each function call of the program. For example, if a random number generation function "PhysicalRandom" is called twice and a 2-message signature generation function "Sign2" is called twice in the program, then four combinations each having one of two (real) random number generation functions and one of two (real) signature generation functions are extracted because alternate function type information of No. 1 in FIG. 11 is extracted in accordance with each combination of real security functions. As for alternate real function type information of No. 2 in FIG. 11, four combinations are extracted in the same manner as described above, so that eight pieces of alternate real function type information in total are extracted consequently.

The partial data flow conversion portion 29 converts the target program stored in the program storage portion 21 into partial data flows, so that the partial data flows are stored (in addition to the target program) in the program storage portion 21.

The partial data flows are formed in such a manner that a program is converted into a data flow indicating connection of variables in the program and inputs/outputs of respective processes in the program, and the data flow is separated into partial data flows, that is, such units that protection attributes of included variables must be the same.

Figure 14:
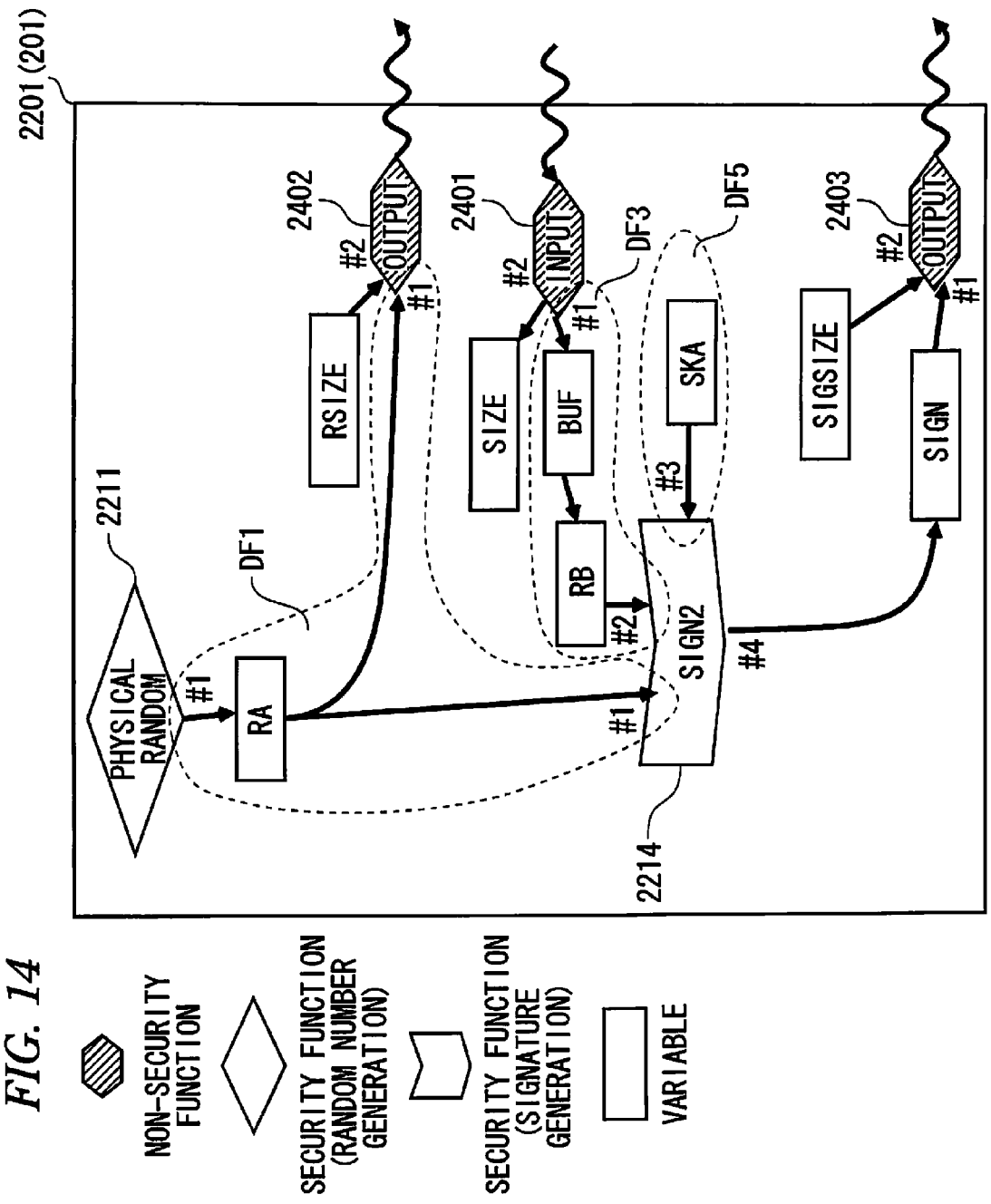
FIG. 14 illustrates a data flow of the target program according to the first embodiment.

Before an example of the partial data flow will be shown, a data flow for the target program shown in FIG. 4 is shown in FIG. 14. Such a data flow can be obtained by syntax analysis of the program. Because FIG. 14 is substantially the same as FIG. 2, functions and variables like those in FIG. 2 are referred to by the same codes. The input (2401 in FIG. 2) from the system B 2101 is expressed as an input function "Input" 2401. The random number generation function 2211 is expressed as a function "PhysicalRandom" 2211. The signature generation function 2214 is expressed as a function "Sign2" 2214. The outputs (2402 and 2403 in FIG. 2) from the system A 2201 are expressed as output functions "Output" 2402 and 2403. A variable (input variable) from the external device 103 shown in FIG. 1 is taken to a function "Input" 2401 which is a non-security function. Variables (output variables) are returned from the functions "Output" 2402 and 2403 to the external device 103. Confidential information concerned with security is a secret key (skA) 2213 which is embedded to the system A 2201 achieved by the target program and which is expressed in a rectangular symbol. With respect to security functions, a signature verification function 2214 is expressed in a chevron symbol, and a random number generation function 2211 is expressed in a rhombic symbol.

In this embodiment, this data flow is separated into partial data flows each having an input/output of a real security function, an input/output of a real non-security function or a terminating variable as an end point. When the data flow is separated in this manner, all inputs/outputs (variables) of each security function or each non-security function are included in different partial data flows. On the other hand, with respect to an instruction of assignment or an operator (other than security or non-security functions), variables included in the instruction are included in the same partial data flow. For example, when there is an assignment instruction such as a=b, a and b are included in the same partial data flow. In protection attribute automatic determination which will be described later, protection attributes as to each partial data flow are determined so that variables included in the partial data flow take the same protection attribute. For example, DF1 in FIG. 14 is a partial data flow having a random number generation function "#2211_PhysicalRandom", an output function "#2402_Output" and a signature generation function (2 messages) "#2214_Sign2" as end points. This means that protection attributes of inputs/outputs "#2211_PhysicalRandom (#1)", "#2402_Output(#1)" and "#2214_Sign2" belonging to the partial data flow and a variable "rA" really put as an input/output thereof must be the same. DF3 in FIG. 14 is a partial data flow having a signature generation function (2 inputs) "#2214_Sign2" and an input function "#2401_Input" as end points. Inputs/outputs "#2214_Sign2(#2)" and "#2401_Input(#1)" of the respective functions and variables "rB" and "buf" really put in the inputs/outputs belong to the same partial data flow. The reason why "rB" and "buf" belong to the same partial data flow is that a process due to a security function or a non-security function is not put between these two variables. In practice, in the target program shown in FIG. 4, these variables have relation of assignment "rB=buf" so that there is no process based on a security or non-security function. In the data flow shown in FIG. 14, these two variables are directly connected to each other by an arrow, which means that functional calculation of neither security function nor non-security function is put between the two variables. DF5 in FIG. 14 is a partial data flow having a signature generation function (2 messages) "#2214_Sign2" and a terminating variable "skA" as end points. The terminating variable is a variable which is not an input of any function or not an output of any function. Besides "skA", "rsize", "size" and "sigsize" in FIG. 14 are terminating variables.

Partial data flows stored in the program storage portion 21 may be expressed in graph as shown in FIG. 14 or may be expressed in table based on variables belonging to the same partial data flow as shown in FIG. 15. Description of this embodiment will be made by use of partial data flow expression shown in FIG. 15.

The selection portion 30 selects and acquires second alternate function type information stored in the second alternate function type storage portion 28. For example, the selection portion 30 selects and acquires one pieces of unselected alternate real function type information stored in the second alternate function type storage portion 28. When a piece of alternate real function type information is selected, the selected one of alternate real function type information is sent to the judging portion 31. When no piece of alternate real function type information is selected (all have been selected or there is no piece of alternate function type information in the second alternate function type storage portion 28 originally), the selection portion 30 notifies the protection attribute determination portion 33 (which will be described later) of failure in determination of protection attribute although such an arrow is not shown in FIG. 3.

For example, when alternate real function type information in FIG. 13 is stored in a second alternate function type storage portion 28, No. 1, No. 2 can be selected and acquired.

The judging portion 31 accepts alternate real function type information selected by the selection portion 30 and determines whether a specific procedure in the accepted alternate real function type information is present in the program stored in the program storage portion 21. Specifically, as for a combination of a specific output of each start point real security function and a specific input of each end point real security function included in the selected specific procedure, determination is made as to whether the specific output of start point real security function and the specific input of end point real security function are included in the same partial data flow or not. In this embodiment, the judging portion 31 makes determination by using the partial data flows stored in the program storage portion 21.

The updating portion 32 replaces real function type information in the second function type storage portion 24 by real function type information included in alternate real function type information selected by the selection portion 30 in accordance with a determination result in the judging portion 31.

The protection attribute determination portion 33 determines protection attribute of each variable in the target program 11 based on real function type information stored in the second function type storage portion 24, and outputs a protection attribute determination result 12. Specifically, as for all real security functions in the target program stored in the program storage portion, when protection attribute information of all input/output variables of the real security functions coincides with protection attribute information included in any one of pieces of real security function type information stored in the second function type storage portion, the protection attribute determination portion 33 determines the coincident protection attribute information as protection attribute information of each variable.

That is, as for all real security functions and all real non-security functions in the target program stored in the program storage portion, when there is protection attribute information of all variables included in the target program so that protection attribute information of input/output variables of the real security functions and real non-security functions coincides with protection attribute information defined in any one of pieces of real function type information of the real security functions and the real non-security function stored as function type information according to each real function respectively, such protection attribute information is returned. If there is no such protection attribute information, error is returned. Moreover, when notice of failure in determination of protection attribute is received from the selection portion 30, error is returned. In this embodiment, for example, the protection attribute determination portion 33 performs protection attribute determination by using partial data flows stored in the program storage portion 21. When protection attribute determination succeeded, the protection attribute determination result 12 consists of all variables in the target program and protection attributes corresponding to the variables. For example, when protection attribute automatic determination for the target program shown in FIG. 4 succeeded, all variables (variables declared in lines 2 to 11 in FIG. 4) and protection attributes for the variables are returned as shown in FIG. 16. On this occasion, an execution log of the protection attribute automatic determination 55 may be included. Moreover, in protection attribute determination result in FIG. 16, information indicating selected overloaded definition (symbol) of function type information for each function and inputs/outputs (such as #2211_PhysicalRandom (#1) in the example of FIG. 15) of respective real functions included in a partial data flow or a protection attribute determination table which will be described later and protection attribute information thereof may be returned. On the other hand, when protection attribute determination failed, the protection attribute determination result 12 may be a specific object, an error message, etc. meaning failure in determination of protection attribute or may be an execution log of the protection attribute determination portion 33.

The protection attribute determination table storage portion 34 stores a protection attribute determination table. The protection attribute determination table is provided in the form that determined protection attributes of respective partial data flows and protection attribute candidates allowed to be taken by respective variables are added to the partial data flows in the target program.

The restoration portion 35 replaces real function type information in the second function type storage portion 24 by real function type information acquired from the temporary storage portion 25 in accordance with whether protection attribute determination in the protection attribute determination portion 33 succeeded or failed.

In this embodiment, when a protection attribute of a variable in a program cannot be determined only by a function type having a protection attribute defined in consideration of a single function, protection attribute determination can be performed in consideration of a specific procedure.

(2) Operation

Figure 17:
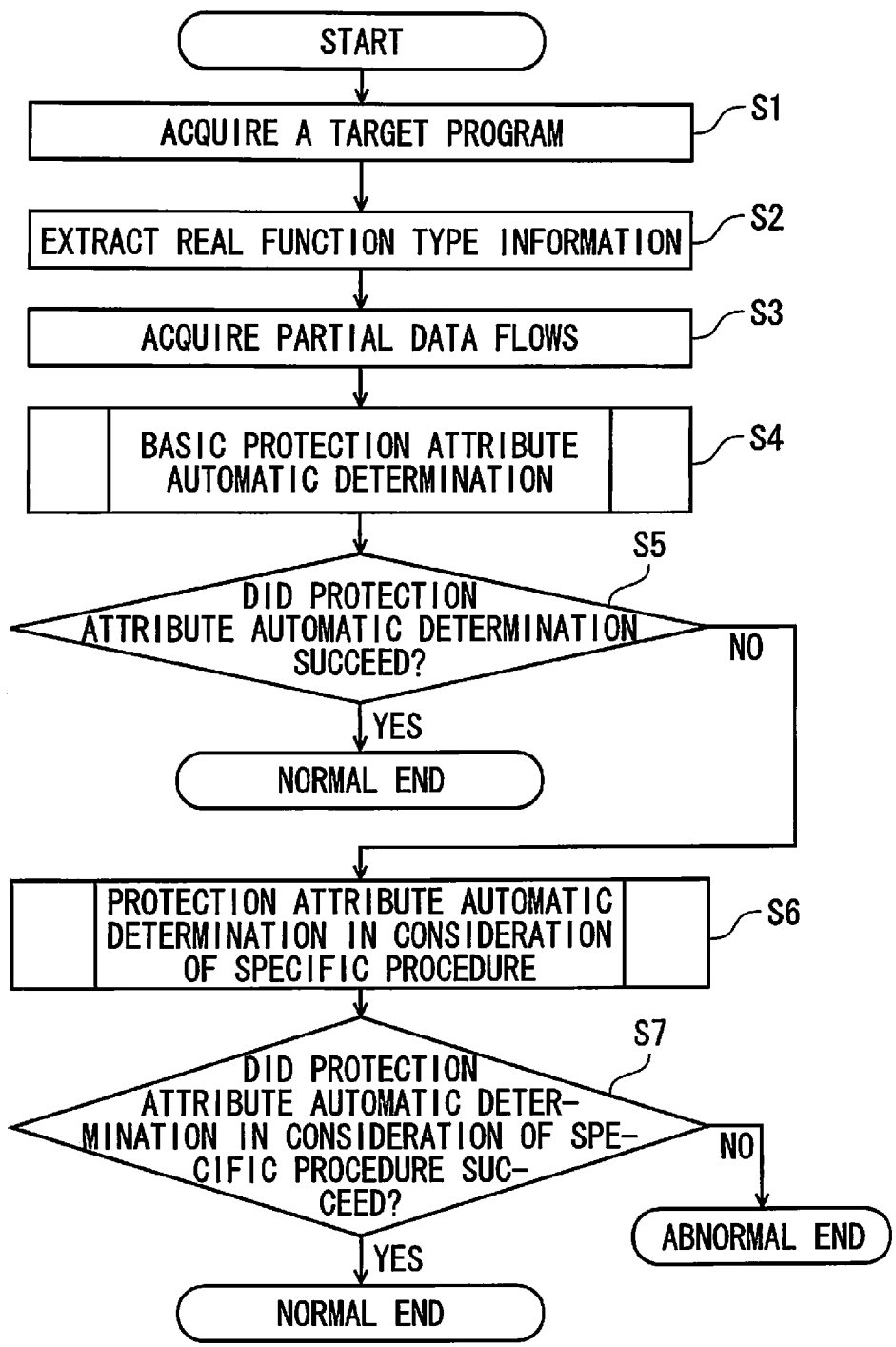
FIG. 17 illustrates a flow of a protection attribute determination process according to the first embodiment.

A protection attribute determination process performed by the information processing apparatus 1 according to this embodiment will be described next with reference to FIG. 17. In the protection attribute determination process, the information processing apparatus 1 gives protection attributes appropriately to respective variables of the given program in consideration of a conversion rule of the aforementioned protection attributes, an assignment rule of variables, function types of input/output variables in security functions and non-security functions and presence of a specific procedure.

First, the program acceptance portion 20 acquires the target program 11 in the program storage portion 21 (Step S1).

Then, the function type extraction portion 23 extracts real function type information (first real function type information in the scope of Claims) from corresponding function type information (first function type information in the scope of Claims) stored in the first function type storage portion 22 in accordance with each real security function included in the target program 11 stored in the program storage portion 21, and stores the extracted real function type information in the second function type storage portion 24 and the temporary storage portion 25 (step S2).

Then, the partial data flow conversion portion 29 converts the target programs stored in the program storage portion 21 into partial data flows, and stores (writes) the partial data flows (in addition to the target program) in the program storage portion 21 (step S3).

For example, when the target program in FIG. 4 and the function type information in FIG. 6 are used as inputs, the real function type information in FIG. 10 (first real function type information in the scope of Claims) is stored in the second function type storage portion 24, and the target program in FIG. 4 and the partial data flows shown in FIG. 15 are stored in the program storage portion 21.

Successively, the protection attribute determination portion 33 determines (without consideration of a specific procedure) protection attributes of respective variables in the target program 11 stored in the program storage portion 21 by using the real function type information stored in the second function type storage portion 24 (step S4: basic protection attribute automatic determination), and outputs the protection attribute determination result 12.

When protection attribute determination in the basic protection attribute determination process succeeded (step S5: YES), the information processing apparatus 1 terminates processing normally. When protection attribute determination failed (step S5: NO), a protection attribute determination process is performed in consideration of the specific procedure according to this embodiment (step S6). When protection attribute determination in the protection attribute determination process in consideration of the specific procedure succeeded (step S7: YES), the information processing apparatus 1 terminates processing normally. When protection attribute determination failed (step S7: NO), processing is terminated abnormally. The protection attribute determination process in consideration of the specific procedure will be described later in detail.

Figure 18:
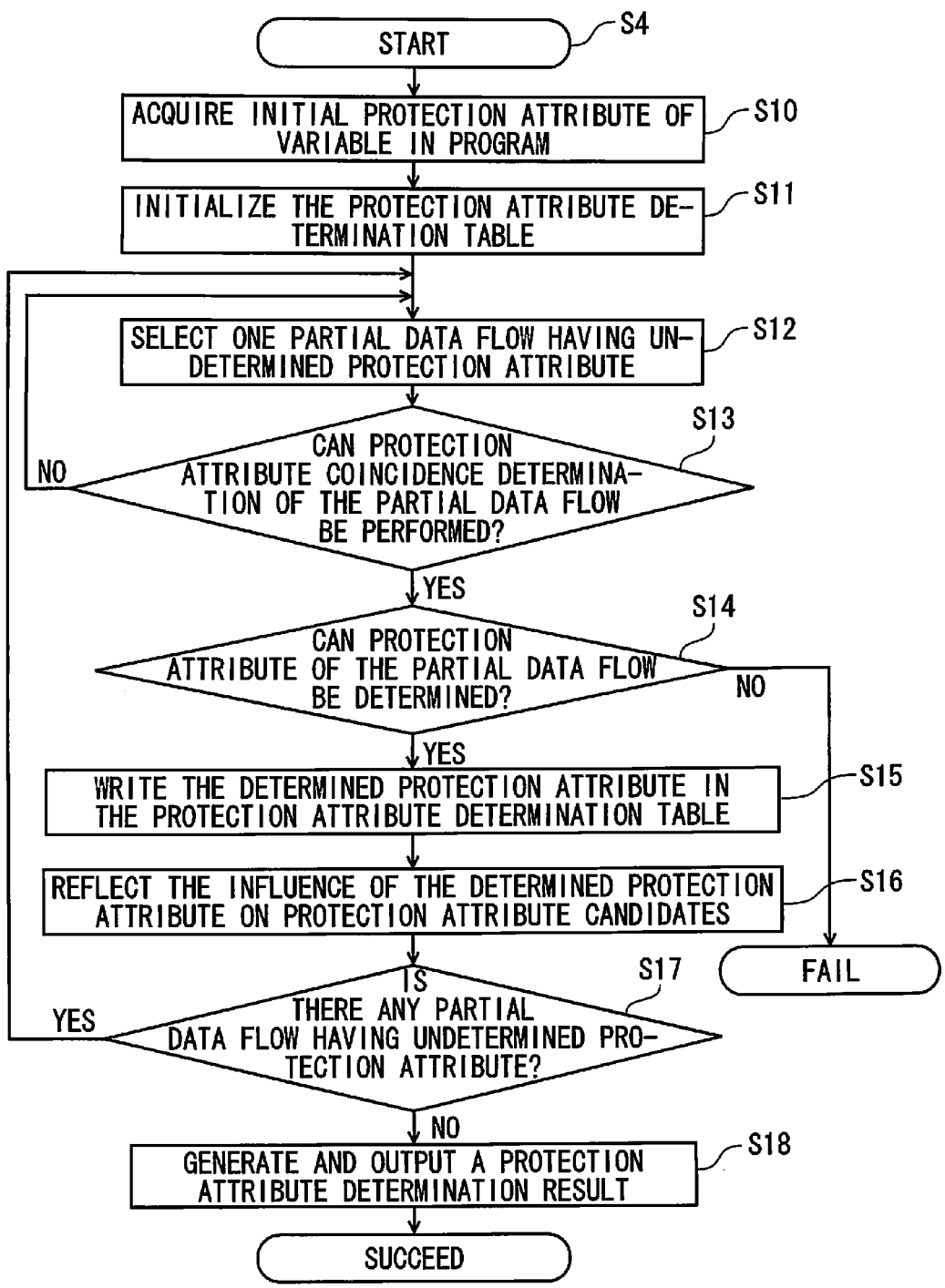
FIG. 18 illustrates a flow of a basic protection attribute determination process according to the first embodiment.

The basic protection attribute determination process in step S4 will be described in detail with reference to FIG. 18. First, the protection attribute determination portion 33 acquires initial protection attribute information given to variables and constants in the program by declaration analysis of the target program 11 (step S10).

Then, the protection attribute determination portion 33 generates (initializes) a protection attribute determination table in the protection attribute determination table storage portion based on the initial protection attribute information acquired in the step S10, the partial data flows in the target program 11 and the real function type information stored in the second function type storage portion 24 (step S11). The protection attribute determination table is provided in the form that determined protection attribute information of respective partial data flows and protection attribute candidate information allowed to be taken by respective variables are added to the partial data flows in the target program.

For example, when the target program in FIG. 4, the real function type information in FIG. 10 and the partial data flows in FIG. 15 are used as inputs, the protection attribute determination table is formed as shown in FIG. 19.

The left two columns are quite the same as in the partial data flows in FIG. 15. Although the determined protection attribute information is protection attribute information determined in accordance with each partial data flow number, the determined protection attribute information is generated as all blanks because the determined protection attribute information has not been determined yet initially. In the protection attribute candidate information, protection attribute of variables to be taken as inputs/outputs defined in real function type information are described in input/output portions of each function, and initial protection attributes written in the program are described in other variable portions (without any designated function name) if there are corresponding initial protection attributes. For example, because the protection attribute of a function input/output #2211_PhysicalRandom (#1) of partial data flow No. 1 is overloaded as "verified", "concealed" or "confidential" based on the real function type information in FIG. 10, these are written ("/" in FIG. 19 expresses "or"). On the other hand, because a function input/output #2214_Sign2(#3) of partial data flow No. 5 is defined as "confidential" in either of overloaded definitions A and B of the real function type information in FIG. 10, only "confidential" is written. Based on the initial attribute information acquired in the step S10, a variable skA of partial data flow No. 5 is "confidential". There is no restriction in portions in which protection attribute candidate information is blank. That is, the same as "exposed/fixed/hidden/verified/concealed/confidential" is recorded.

Then, the protection attribute determination portion 33 selects one of partial data flows in which protection attribute information has not been determined (determined protection attribute information is blank) (step S12).

Then, the protection attribute determination portion 33 determines whether protection attribute coincidence judgment of the selected partial data flow can be performed or not (step S13). The coincidence judgment can be performed based on whether there exists a variable in variables included in the selected partial data flow of which only one piece of protection attribute information is recorded as protection attribute candidate information or not. In the example of FIG. 19, variables each having only one piece of protection attribute information recorded as protection attribute candidate information are #2401_Input(#1), #2401_Input(#2), skA and #2214_Sign2(#3).

If the determination result is YES, the protection attribute determination portion 33 judges whether the protection attribute of the selected partial data flow can be uniquely determined or not (step S14). Specifically, the protection attribute determination portion 33 selects one of variables included in the selected partial data flow and having only one piece of protection attribute information recorded as protection attribute candidate information (whose presence is confirmed in the step S13), and checks whether protection attribute information "att" which is (only) recorded as protection attribute candidate information of the selected variable is included in protection attribute candidate information of all variables included in the selected partial data flow or not (step S14). When "att" is included, determination is made that the protection attributes of all variables can be determined as "att" (step S14: YES). When the protection attributes of all variables cannot be determined uniquely (step S14: NO), the protection attribute determination process is terminated unsuccessfully because protection attributes cannot be assigned to satisfy the restriction.

When the protection attributes of the selected partial data flow can be determined (step S14: YES), the protection attribute determination portion 33 writes the protection attribute (protection attribute information "att" in the description of the step S14) determined in the previous step as determined protection attribute information of the selected partial data flow as determined protection attribute information of the protection attribute determination table (step S15).

Then, the protection attribute determination portion 33 reflects the effect of determined protection attribute information on protection attribute candidate information of the protection attribute determination table (step S16). Specifically, as for respective real security functions or non-security functions included in the selected partial data flow, the protection attribute determination portion 33 selects only overloaded real function type information in which a variable included the selected partial data flow can take the determined protection attribute of the selected partial data flow, and updates the protection attribute candidate information of variables of the security function or non-security function in the protection attribute determination table based on the selected function type information.

For example, if the determined protection attribute of partial data flow No. 1 becomes "verified" in FIG. 19, #2402_Output(#1) is determined as "verified". In view of real function type information shown in FIG. 10, because the protection attribute of the first variable (#2402_Output(#1)) is "exposed" in one A of overloaded definitions of #2402_Output and "verified" in the other overloaded definition B, no definition but the overloaded definition B can be taken. Consequently, the protection attribute of the second variable (#2402_Output(#2)) can take nothing but "verified" from the overloaded definition B. Accordingly, the protection attribute candidate information of #2402_Output(#2) of partial data flow No. 2 in the protection attribute determination table shown in FIG. 19 is updated from "exposed/verified" to "verified". Similarly, because the protection attributes of #2211_PhysicalRandom(#1) and #2214_Sign2(#1) are determined as "verified", overloaded definition C is selected for #2211_PhysicalRandom and overloaded definition B is selected for #2214_Sign2(#1), and pieces of protection attribute candidate information of #2214_Sign2(#2) and #2214_Sign2(#4) are updated from the overloaded definition B of #2214_Sign2 to "verified" and "verified" respectively accordingly.

Then, the protection attribute determination portion 33 determines whether a partial data flow having an undetermined protection attribute (determined protection attribute is blank) is present in the protection attribute determination table or not (step S17). When there is no partial data flow having an undetermined protection attribute (step S17: NO), protection attribute determination succeeded, and the information processing apparatus 1 generates the protection attribute determination result 12 from all pairs of each variable and determined protection attribute information in the protection attribute determination table, and outputs the protection attribute determination result 12 (step S18) and terminates processing. In this case, the determination result in the step S5 in FIG. 17 becomes affirmative, so that the information processing apparatus 1 terminates processing normally. On the other hand, when there is a partial data flow having an undetermined protection attribute (step S17: YES), processing goes back to the step S12, so that the information processing apparatus 1 repeats the aforementioned processing. On this occasion, since the protection attribute candidate information of variables of the security function or non-security function in the protection attribute determination table is updated in step S16, even when a partial data flow selected in the step S12 and coincidence judgment cannot be performed in the step S13 in the past, may be selected again in the step S12 and its coincidence judgment can be performed in the step S13. As such processing is repeated, the protection attribute candidates in the protection attribute determination table are narrowed successively to determine the protection attributes.

By the way of separation into the partial data flows, each operation except security functions corresponds to one of the partial data flows (input/output variables belong to the same partial data flow). Because the aforementioned checking can guarantee that variables having different protection attributes are not calculated except in security functions, confidential information to be protected can be prevented from being tainted by the attacker.

In the basic protection attribute determination process described in the step S4, the protection attribute of a lot of programs can be determined automatically but there may be the case where the protection attribute cannot be determined automatically. In practice, in the protection attribute determination table shown in FIG. 19, protection attribute candidate information of the first variable "#2401_Input(#1)" of the input function "Input" in the partial data flow of partial data flow No. 3 is "exposed". However, protection attribute candidate information of "#2214_Sign2(#2)" is "verified" or "confidential". Accordingly, protection attribute coincidence is disabled.

In this embodiment, a specific procedure is considered to thereby give one solution to such a case. As shown in FIG. 17, when protection attribute determination failed in the basic protection attribute determination process in step S4, the information processing apparatus 1 performs a protection attribute determination process in consideration of a specific procedure in step S6.

Figure 20:
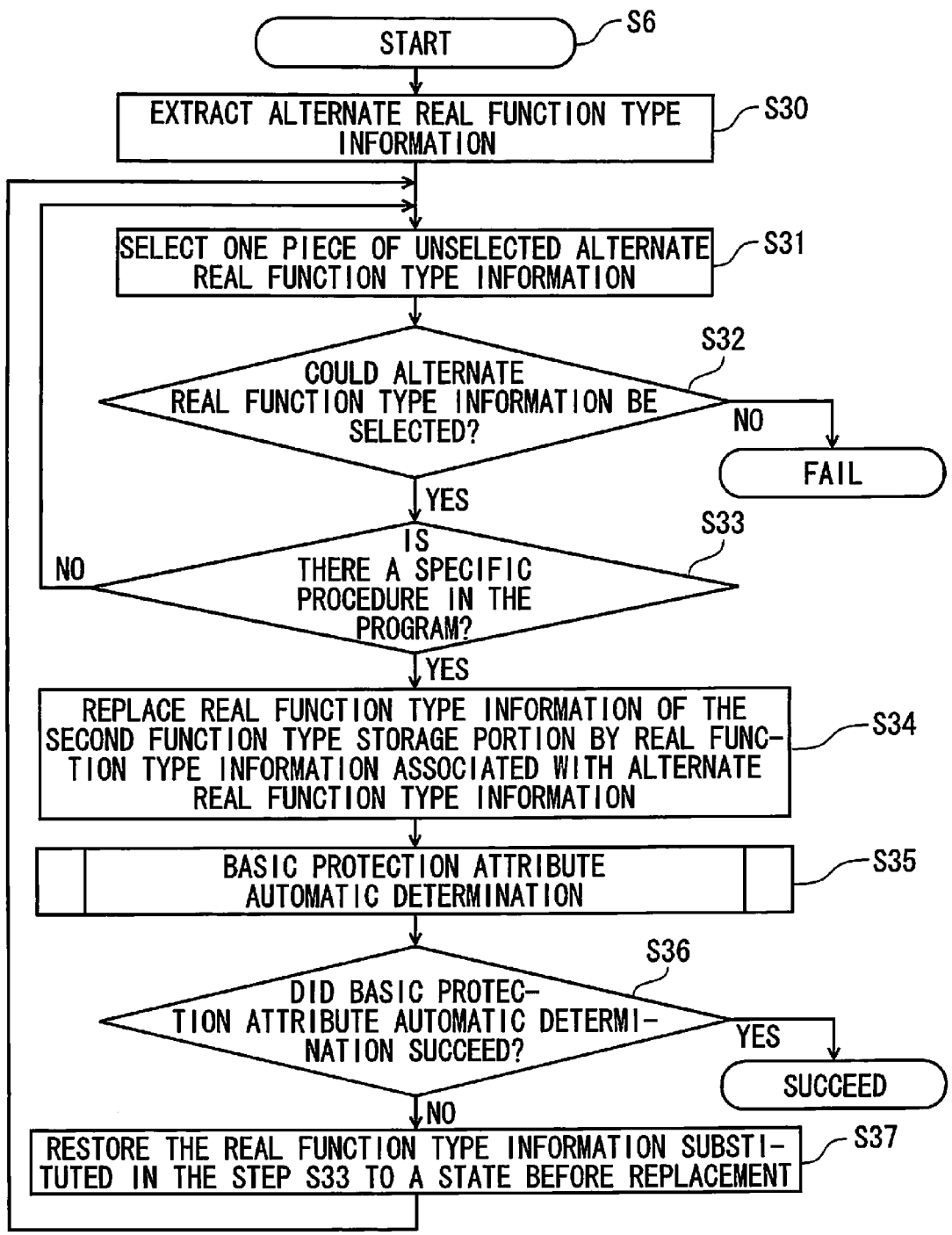
FIG. 20 illustrates a flow of a protection attribute determination process according to the first embodiment.

The protection attribute determination process in consideration of a specific procedure will be described in detail with reference to FIG. 20. FIG. 20 illustrates a flow for the protection attribute determination process in consideration of a specific procedure.

First, the alternate function type extraction portion 27 extracts alternate real function type information having a pair of a specific procedure and a real function type into the second alternate function type storage portion 28 in accordance with each real security function included in the target program stored inn the program storage portion 21 (step S30).

For example, when the target program is as shown in FIG. 4 and the alternate function type information stored in the first alternate function type storage portion 26 is as shown in FIG. 11, the extracted alternate real function type information is as shown in FIG. 13.

Then, the selection portion 30 selects and acquires one piece of unselected alternate real function type information stored in the second alternate function type storage portion 28 (step S31). When unselected one can be selected (step S32: YES), processing goes to step S33. When unselected one cannot be selected (all have been already selected or none is in the second alternate function type storage portion 28) (step S32: NO), protection attribute determination ends in failure. The term "failure" means that any unsafe data flow from the viewpoint of security is present even in consideration of a specific procedure. In this case, the step S7 in FIG. 17 becomes negative, so that the information processing apparatus 1 terminates processing abnormally.

When the step S32 is true, the judging portion 31 determines whether the specific procedure in the alternate real function type information selected by the selection portion 30 is present in the partial data flow stored in the program storage portion 21 (step S33). Specifically, as for a combination of a specific output of a start point real security function and a specific input of an end point real security function included in the selected specific procedure, whether the specific output of a start point real security and the specific input of an end point real security function are included in the same partial data flow or not is determined. When the determination result is true (step S33: YES), processing goes to step S34. When the determination result is false (step S33: YES), processing goes back to the step S31.

For example, when partial data flows are as shown in FIG. 15 and alternate real function type information is as shown in FIG. 13, the selection portion 30 selects No. 1 or No. 2 in FIG. 13 in the step S31. When No. 1 is selected in the step S31, "#2211_PhysicalRandom(#1)" and "#2214_Sign2(#1)" shown in the specific procedure are both included in the partial data flow No. 1 in FIG. 15. Because the specific procedure includes only one combination of a specific output of a start point real security function and a specific input of an end point real security function, the determination result in the step S33 becomes YES. On the other hand, when No. 2 is selected in the step S31, the determination result in the step S33 becomes NO because "#2211_PhysicalRandom(#1)" and "#2214_Sign2(#2)" are included in different partial data flow in FIG. 15.

When there are plural combinations, such as Nos. 3 to 6 in FIG. 11, for each combination, it is checked whether a specific output of a start point function and a specific input of an end point function of the combination are both included in the same partial data flow (specific outputs of a start point function and specific inputs of an end point function of "all" combinations need not be included in the "same" partial data flow).

When the determination result in the step S33 is true, the updating portion 32 replaces real function type information of a real security function in the second function type storage portion 24 by real function type information associated with alternate real function type information of the real security function selected by the judging portion 31 (step S34). For example, when the selection portion 30 in the step S31 in the example selects No. 1 in FIG. 13 and determination in the step S33 results in YES, the result is as shown in FIG. 21 because the updating portion 32 replaces real function type information of #2214_Sign2 in FIG. 10 by real function type information designated by No. 1 in FIG. 13.

Then, the protection attribute determination portion 33 determines protection attributes of respective variables (in consideration of a specific procedure) in the target program stored in the program storage portion 21 by using real function type information stored in the second function type storage portion 24 updated in the step S33 (step S35), and outputs the protection attribute determination result 12. When protection attribute determination in the basic protection attribute determination process succeeded (step S36: YES), the information processing apparatus 1 terminates processing normally. When protection attribute determination failed (step S36: NO), the updating portion 32 restores the real function type information substituted in the step S34 to a state before updating (step S37). Specifically, the restoration portion 35 replaces real function type information (real security function type information) in the second function type storage portion 24 by real function type information of a real security function acquired from the temporary storage portion 25. Then, processing goes back to the step S31.

Figure 23B:
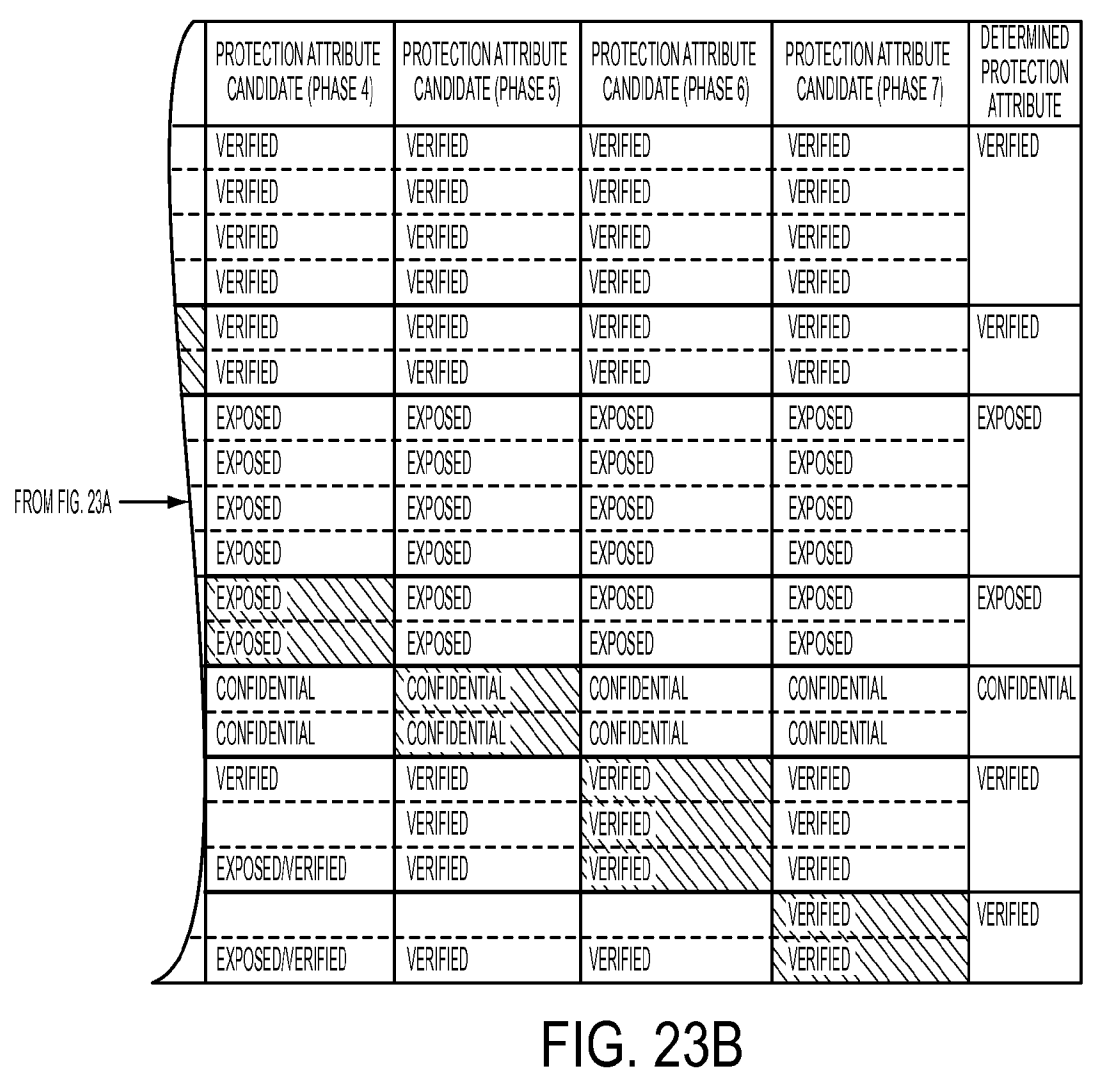

For example, when basic protection attribute determination in the step S35 in the aforementioned example is performed by use of real function type information updated as shown in FIG. 21, the protection attribute determination table of an initial state (after completion of the step S11 in FIG. 18) is as shown in FIG. 22, so that it is found that protection attribute candidate information of partial data flow No. 3 is "exposed" and coincidence-enabled. In practice, when protection attribute automatic determination is performed by use of the protection attribute determination table, change of protection attribute candidate information is as shown in FIG. 23. Although protection attribute candidate information in the protection attribute determination table is updated in practice, a history of changing protection attribute candidate information is shown in FIG. 23 so that a state of narrowing the protection attribute candidates is easy to understand. The hatched block mean that the partial data flow is selected in the step S12 and the protection attribute of a variable having candidates is determined as a bold-faced protection attribute. The boldface in other partial data flows means that the protection attribute of the selected partial data flow is determined to thereby limit the protection attribute candidate information derivatively in the step S16. For example, in phase 1, the protection attribute of partial data flow No. 3 is determined as "exposed" and the protection attribute of #2214_Sign2(#2) is determined as "verified" (to thereby determine the overloaded definition of #2214_Sign2 in FIG. 21 as B) to thereby make the protection attributes of #2214_Sign2(#1) and #2214_Sign2(#4) as "verified". Finally, all protection attributes are determined, so that the protection attribute determination portion 33 outputs the protection attribute determination result 12 shown in FIG. 16.

As described above, in this embodiment, a specific procedure is considered and protection attribute information given to each variable is determined. For example, in the case of the example of the target program shown in FIG. 4, proper protection attribute information can be given to each variable by applying a rule in which only when there is a path from an output of a random number generation function to one of inputs of a signature generation function, signature generation is allowed when a value having no integrity is taken to the other input of the signature generation function.

In protection attribute automatic determination, a protection attribute concerned with integrity or confidentiality is given to each variable used in description of a security protocol so that calculation due to a non-security function and an arithmetic operation such as assignment is limited between variables having the same protection attribute. Accordingly, data to be protected and data not to be protected are separated from each other. Moreover, to satisfy protection attribute conversion based on an encryption process, calculation between variables with different protection attributes is limited to the case due to a security function, and protection attributes of inputs/outputs are limited by function type information in accordance with the type of calculation. For example, a secret key in a decryption function requires both confidentiality and integrity. Although the input ciphertext is non-protected data, the output as a decrypted result is protected data having confidentiality. Accordingly, conversion of protection attributes is limited to only safe calculation. Thus, the case that protected data will be returned to the outside by mistake (conversion error of protection attributes), which may happen in the technique of the back ground art, does not happen.

As described above, in this embodiment, protection attributes can be appropriately given to variables respectively based on a rule of (R3) determining protection attributes in consideration of a specific procedure in addition to two rules of (R1) prohibiting calculation between variables with different protection attributes and (R2) limiting conversion of protection attributes in security function and protection attributes of inputs/outputs. In the background art, function type information cannot be dynamically changed in accordance with a specific procedure, so that proper protection attributes cannot be given. In this embodiment, attention is paid to a specific procedure so that protection attributes can be given appropriately. As examples of such protocols, there are SSL (Secure Socket Layer) and TLS (Transport Layer Security) which are standard protocols in Internet or a drive authentication protocol in AACS (Advanced Access Content System) which is a copy protection specification of video contents. It is useful that the configuration of this embodiment is applied to these protocols.

From the above description, in a programming model capable of accessing two types of memory areas, that is, a protected memory area and a non-protected memory area, it is possible to support safe implementation of a general security protocol using the protected memory area. That is, in this embodiment, protection attributes for respective variables are determined appropriately while attention is paid not only to a flow of data (data flow) but also to each processing such as cryptographic processing and a processing path in order to perform appropriately separation of data to be protected to be stored in the protected memory area and data not to be protected to be stored in the non-protected memory area in a general security protocol on such a programming model. As a result, these variables can be stored in the protected memory area or non-protected memory area appropriately in accordance with protection attributes, so that input/output from the outside using the non-protected memory area and protection in the protected memory area for variables to be held in the inside can be made to consist with each other.

Figure 24:
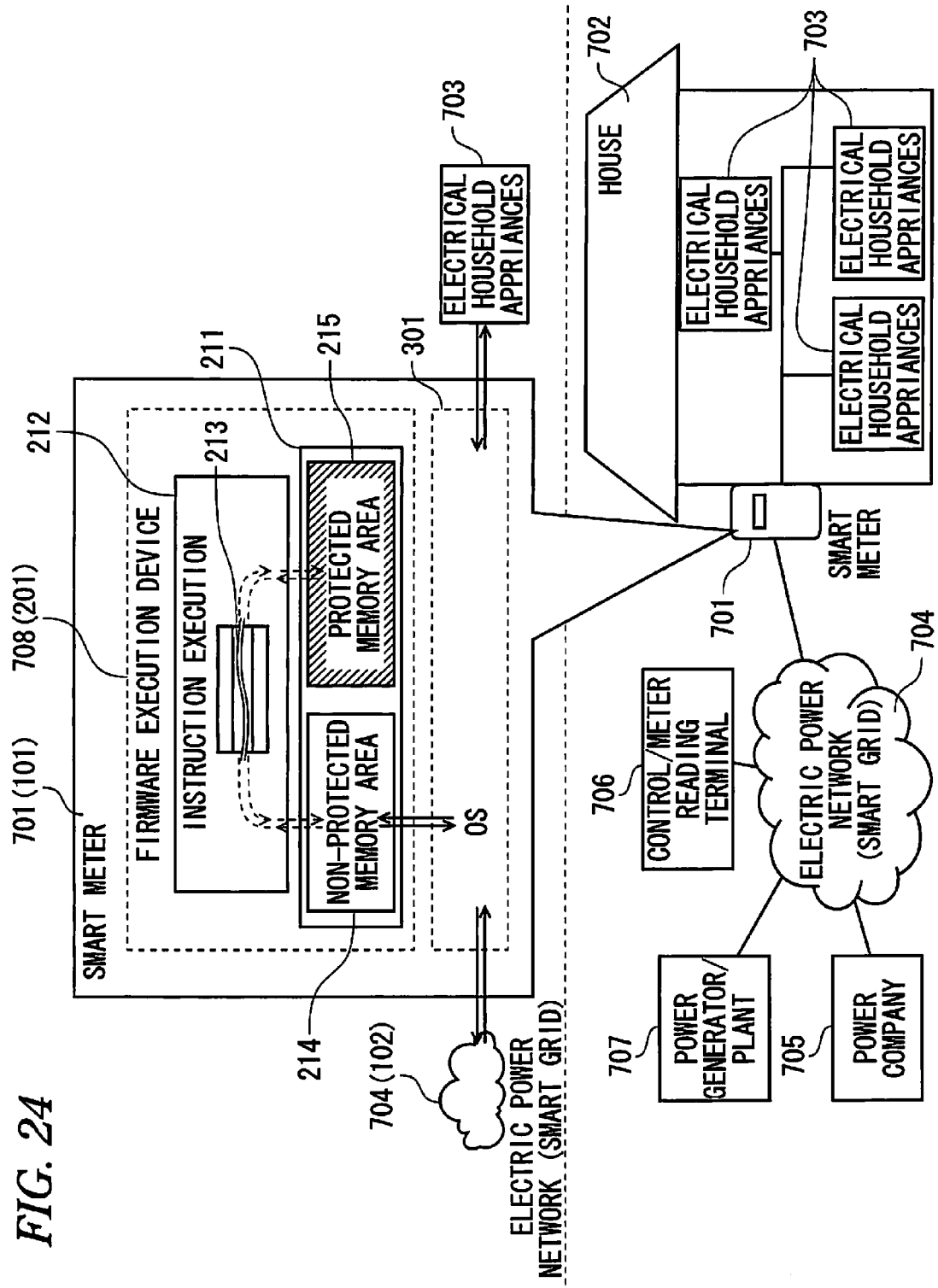
FIG. 24 illustrates an application of the first embodiment to a smart grid.

FIG. 24 illustrates an application of this embodiment to a smart grid.

A smart meter in a smart grid (next-generation electric power network) is regarded as a target system 101 in which a program module is executed based on a security protocol according to this embodiment. The term "smart grid" means a power and communication network or the whole of a system including the network by which a power supply side such as large-scale power generation, distributed power generation, etc. and a power demand side such as a house, an office, etc. are connected. By a control technique using a communication technique, while consumer's power demand is grasped and predicted in a realistic time, power is supplied from a solar power generator or a battery in accordance with the demand or a power supply of a device used in a home or a building is controlled to thereby make it possible to balance power demand and power supply and control both a power supply and a load. The term "smart meter" means a voltmeter having a communication function or the whole of a system including the voltmeter. It is hereinafter conceived that the term "smart meter" expresses the former. A conceptual view of the smart grid and the smart meter is shown in the lower portion of FIG. 24. The smart meter 701 records data such as the amount of electricity used by electrical household appliances 703, power-using machines, etc. in a house 702, an office, etc. The smart meter 701 can perform two-way communication with a power company 705, a control/meter reading terminal 706, a power generator/plant 707, etc. through a power network (smart grid) 704. The smart meter 701 transmits recorded data or controls the electrical household appliances 703 in accordance with a request given from the power company 705, the control/meter reading terminal 706 or the power generator/plant 707. Conversely, it may be conceived that a power supply quantity in the power generator/plant 707 is controlled in accordance with data transmitted from the smart meter 701.

The smart meter 701 uses confidential information to transmit privacy information (confidential information) such as the amount of power usage through the smart grid 704 or perform authentication with the control/meter reading terminal 706 or another smart meter through the smart grid 704. On the other hand, communication with the outside through the smart grid 704 is essential. Therefore, in firmware of the smart meter 701, it is necessary to execute a security protocol and it is necessary to appropriately protect respective data included in the protocol.

An upper portion of FIG. 24 corresponds to FIG. 1 for explaining details of the smart meter 701. A firmware execution device 708 (corresponding to 201 in FIG. 1) of the smart meter 701 (corresponding to 101 in FIG. 1) has a protected memory area 215, and a non-protected memory area 214. For example, an on-chip memory inside a processor and an off-chip memory outside the processor can be regarded as the protected memory area 215 and the non-protected memory area 214 respectively. In this case, protection attributes of variables (including confidential information, etc.) in a firmware (program) for achieving a security protocol executed by the smart meter 701 can be determined appropriately and values of the variables can be protected appropriately by use of the information processing apparatus 1 according to this embodiment. Particularly, a challenge-and-response protocol is often used in authentication or the like, so that protection attributes suitable for respective variables can be determined for a program which achieves a challenge-and-response protocol which could not make determination by the background-art technique, by protection attribute automatic determination inconsideration of a specific procedure according to this embodiment.

In the embodiment, because only one piece of alternate real function type information is selected in the step S31, real function type information is updated by use of only one piece of alternate real function type information. Besides this, protection attribute automatic determination in consideration of plural specific procedures for selecting pieces of alternate real function type information at once can be analogized easily from the aforementioned embodiment.

For example, in step S31 in FIG. 20, one subset is selected from a set of the whole of alternate real function type information recorded in the second alternate function type storage portion 28. In step S33, determination is made as to whether specific procedures associated with all pieces of alternate real function type information included in the subset are present in a program or not. In step S39, real function type information (corresponding to first real function type information in the scope of Claims) of the second function type storage portion is updated based on real function type information associated with all pieces of alternate real function type information (corresponding to second alternate function type information in the scope of Claims) included in the subset. In step S36, basic protection attribute automatic determination is performed. Accordingly, protection attribute automatic determination in consideration of plural specific procedures can be performed. Alternatively, protection attribute automatic determination in consideration of plural specific procedures can be performed when real function type information is updated recursively or when processing is executed repeatedly while necessary information is managed.

According to this embodiment, protection attributes can be determined appropriately for respective variables in a program according to a security protocol.

Although the embodiment has been described in the case where detection of a specific procedure in the step S33 and protection attribute automatic determination in the step S35 (or S4) are performed by use of partial data flows, it is unnecessary to use the partial data flows.

Detection of a specific procedure may be performed by use of an algorithm such as graph matching as to whether a graph (e.g. data flow in FIG. 12) indicating the specific procedure is present in a graph (e.g. data flow in FIG. 14) of the target program or not. Alternatively, the target program may be directly analyzed to thereby examine whether there is any variable used commonly in a specific output of a start point real security function and a specific input of an end point real security function in a specific procedure or not.

As for protection attribute automatic determination, in the aforementioned embodiment, an arithmetic operation due to assignment or an operator is not used as an end point of a partial data flow but inputs/outputs thereof are made to belong to the same partial data flow to thereby define a condition that protection attributes of the inputs/outputs must be the same. Alternatively, as for an instruction using assignment or an operator, real function type information that inputs/outputs must take the same protection attribute may be stored in the second function type storage portion whenever an instruction is called, so that protection attributes of all variables included in the target program in which a protection attribute of an input/output variable with respect to each real function and an arithmetic operation due to assignment or an operator coincides with a protection attribute defined by each piece of corresponding real function type information. Because this determination is regarded as a question for finding a solution (protection attribute information of each variable) satisfying the constraint condition (due to real function type information), a generally known algorithm for solving a constraint satisfaction problem may be used. For example, the way that protection attributes of all variables is temporarily determined and it is checked whether each (temporarily) protection attribute satisfies a constraint condition due to real function type information or not, or the way that selection of one of protection attribute candidates of all variables is performed efficiently by use of a back track or the like may be considered.

Second Embodiment

A second embodiment as to an information processing apparatus, a program development system, a program verification method and a program will be described next. Parts common to those in the first embodiment will be described by use of the same numerals or description thereof will be omitted.

The configuration of this embodiment has, in addition to the configuration of the first embodiment, a protection attribute declaring portion which defines (declares) a protection attribute returned from the protection attribute determination portion for each variable in the target program, and a compiling portion which assigns memory areas for storing values of the variables in accordance with the protection attribute of each variable based on the target program and generates an executable program which can be executed by a computer on which the memory areas are implemented.

In this embodiment, a system for performing generation and development of a machine language program will be described. In the protection attribute determination process in the first embodiment, a target programs is analyzed and a proper protection attribute is determined and given to each variable. However, the determination must be performed suitably on the assumption that a data flow in a security protocol is written correctly in description of the target programs. It is also assumed that the specification of the security protocol itself has no defect of leaking confidential information carelessly. Several methods have been already known for security verification of the security protocol specification itself. This embodiment is based on the assumption that security of the security protocol to be implemented is verified in advance. As an example of such a technique, an example of protocol verification using a formal method has been disclosed in a reference "Reasoning About Belief in Cryptographic Protocols" Li Gong, Roger Needham, Raphael Yahalom 1990 IEEE Symposium on Security and Privacy, 1990". In this embodiment, the security protocol specification to be implemented is not limited to the security protocol specification verified by the method of the reference but this embodiment is based on the assumption that some security verification is performed in advance.

When verification is made as to whether a data flow in a security protocol is implemented correctly or not, so-called functional test is generally used for checking whether input/output follows the specification correctly when the target program is executed. On the other hand, in this embodiment, protection attributes of variables can be determined automatically but the protection attributes can be determined appropriately on the assumption that a data flow of the protocol is implemented correctly. Accordingly, a programmer corrects (eliminates) error of the data flow in a first phase before the information processing apparatus 1 according to this embodiment automatically determines protection attributes in a second phase.

Figure 25:
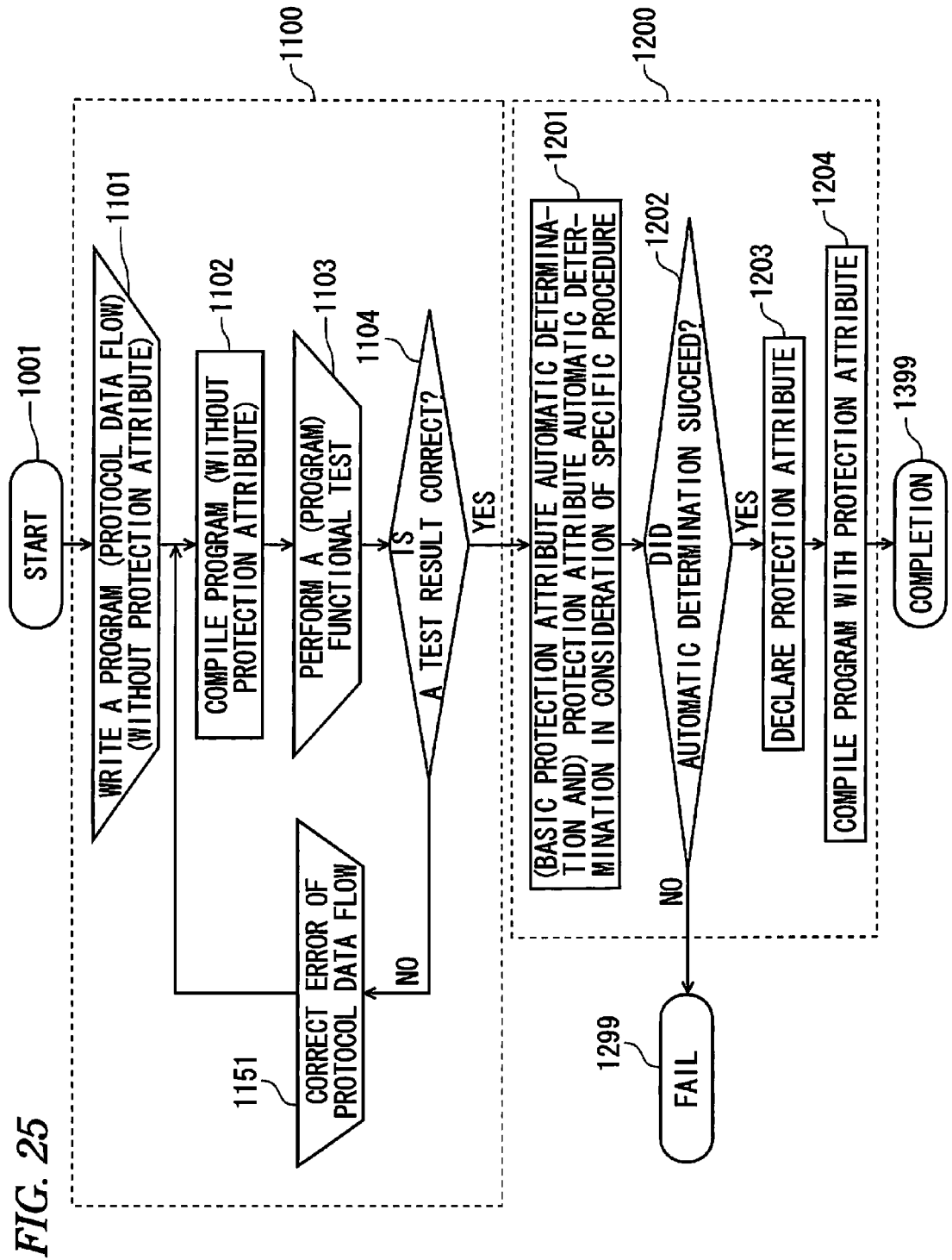
FIG. 25 illustrates a program development flow with the protection attribute determination process according to a second embodiment.

FIG. 25 shows a program development flow to which a protection attribute determination process according to this embodiment is applied. The development flow is roughly classified into two phases. One is a phase 1100 in which a programmer corrects (eliminates) error of the data flow by using functional test. The other is a phase 1200 in which the information processing apparatus 1 determines protection attributes automatically for respective variables in the data flow and generates an executable program automatically. In the phase 1100, the programmer begins to develop a program about the security protocol and writes a program while paying attention to the correctness of the data flow (step S1101). In the step, the programmer writes the program without declaring protection attributes to the variables. However, it is generally conceived that the programmer recognizes proper protection attributes at this point of time with respect to some variables in implementation of the data flow, e.g. variables as root of trust such as a secret key of the programmer.

Then, the programmer generates the executable program by a compiler (step S1102) and executes the executable program to perform a functional test as to whether desired output data is obtained for input data for functional test or not (step S1103). When the functional test failed (step S1104: NO), the programmer corrects error of the data flow (step S1151), performs compiling and functional test again in the steps S1102 and S1103 and repeats the steps S1151, S1102 and S1103 until the result of the functional test becomes correct (step S1104: YES). If proper input data for functional test is given, error of the data flow ought to be eliminated when the result of the functional test becomes correct. Then, the programmer inputs the program as a target program into the information processing apparatus 1 so that the information processing apparatus 1 performs a protection attribute determination process (FIG. 17) in consideration of basic protection attribute automatic determination and a specific procedure described in the first embodiment. As an input to the information processing apparatus 1, a protection attribute as the root of trust recognized by the programmer in the step S1101 may be given as an initial protection attribute of each variable in the target program. When protection attribute determination failed as a result of the protection attribute determination process (step S1202: NO), it is conceived that the program becomes such a program that confidential information is (directly) returned or (indirectly) leaked to the outside or a variable to be protected is tainted with an unreliable input because the programmer adds an unnecessary variable or data flow for implementation even when the data flow is written correctly in accordance with the specification of the security protocol.

On the other hand, when protection attribute determination succeeded (step S1202: YES), the protection attribute declaring portion in the information processing apparatus 1 rewrites the program list of target programs. Specifically, the protection attribute declaring portion adds (declares) automatically determined protection attributes to respective variables of the program (step S1203). FIG. 26 illustrates a rewritten target program for the case that the target program shown in FIG. 4 is rewritten in accordance with the protection attribute determination result shown in FIG. 16. FIG. 26 shows that protection attributes are given to parameters (variables) in the fourth and fifth lines and variables in the seventh to eleventh lines. Finally, the compiling portion in the information processing apparatus 1 compiles the program rewritten in the step S1203 (step S1204). As a result, an executable program is generated so that the values of variables can be stored appropriately in the protected memory area or non-protected memory area in accordance with the protection attribute.

According to the aforementioned configuration, even when a programmer having no (detailed) knowledge of security develops a program about a security protocol, the information processing apparatus 1 gives proper protection attributes to respective variables automatically so that the programmer can develop an executable program in which the values of variables are stored in a proper memory in accordance with the protection attribute. Accordingly, both efficiency of development and security of a program about a security protocol can be improved.

For example, in a firmware (program) for achieving a security protocol executed on the smart meter 701 shown in FIG. 24 in the first embodiment, it is possible to generate a firmware (program) in which values of variables in the program are stored appropriately in an on-chip memory (protected memory 215) inside a processor and an off-chip memory (non-protected memory 214) outside the processor and which is executed according to the embodiment.

For example, the embodiments will be applied to the following scene.

A sense of computer security has increased recently with advance of wide use of an information device such as a PC (Personal Computer). For this reason, to safely execute a software having data (data to be protected) such as private information to be protected in the inside of a computer, it is necessary to separate data to be protected having confidentiality and data not to be protected to be taken/returned to/from the outside in use so that data protected in the software is prevented from being returned to the outside. For example, when there is data to be protected in the computer, an area allowed to be accessed by a user is separated in accordance with a privilege mode of OS (Operating System) and a normal mode to thereby prevent data from being read out needlessly. In the background art, instead of switching the mode, data and instructions in a secure memory area cannot be retrieved from the outside in order to avoid abusing of protected data. That is, there is a mechanism in which memory areas accessed by the processor are a secure area and an unsecure area, and in which a kind of security tag indicating "secure" is given to information read from the secure area to a register so that the data cannot be written into the unsecure area. Such a mechanism prevents information from being leaked from the secure area into the unsecure area.

As a method of achieving a memory area (protected memory area) called secure area, the memory area may be achieved by only access control or may be achieved by a combination of an encryption mechanism in the background art and access control of a memory in a chip. When protection is achieved by a combination with an encryption mechanism, the concept "protection" is separated into two types, that is protection of confidentiality which is such a property that a person having authority only can access information but a person having no authority cannot read information, and protection of integrity which is such a property that information is so correct and accurate that information is neither lacking nor falsified by an attacker. Only one of the two types of protection may be provided. It is a matter of course that both protection of confidentiality and protection of integrity can be provided.

Although a method according to the background art provides a memory area as hardware for separating data into data to be protected and data not to be protected, data to be protected and data not to be protected are mixed inevitably in calculation due to a function when data to be protected and data not to be protected are used for implementing a security protocol. For example, in the case of a function performing encryption with secret key, a message to be exchanged secretly as data to be protected is encrypted with a secret key into a ciphertext which can be returned to the outside. The "ciphertext which can be returned to the outside" means that the ciphertext is data not to be protected, that is, a message which is data to be protected and information of a secret key are prevented from being leaked even when the ciphertext is returned.

In the method according to the background art, such a mechanism that a security tag is released exceptionally to make it possible to mix data to be protected and data not to be protected is provided in this case. It is however a possibility that this mechanism cannot be prevented from being abused. That is, there is a possibility that data to be protected will be returned to the outside when the security tag is released by mistake.

In the background art, when some sets of data and instructions with different protection level are present in a program, data exchange between sets with different security level is checked by a method called "Information Flow Analysis" to prevent information of data in high-level set from being leaked to a low-level set. Specifically, data movement between sets with different security levels is checked by type checking and a special operation such as encryption is forced to the programmer when high-level data is converted to a low-level data. Data conversion of a low-level to a high-level can be performed arbitrary. In this method, conversion of security level of data due to an encrypting operation is used so that data to be protected and data not to be protected can be mixed in an encrypting process. However, in the background art, an encryption key for outputting data to be protected is limited to a statically embedded value in the program or a derivative value of a statistically embedded value in the program. Therefore, a value transmitted from the outside or a value shared with the outside is prohibited from being used as an encryption key. Because a method of using such an encryption key is often used in a security protocol, it is difficult to apply the technique according to the background art to a security protocol generally. Accordingly, to safe implementation of a security protocol, it is desired that determination is made appropriately as to whether data protection is required for each variable in a program or not.

To solve this problem, a protection attribute determination method according to the background art pays attention to security functions such as encryption, signature, hash function, etc. included in a security protocol. In the background art, a protection attribute requesting to store the values of variables in a protected memory area or a non-protected memory area based on presence/absence of confidentiality property and integrity property in each security function is defined so that the protection attribute of each variable in a program is determined based on this condition. In the background art, there is a method of determining the protection attribute properly about a security protocol using a value transmitted from the outside or a value shared with the outside as an encryption key.

In the background art, protection attributes are determined while input/output protection attribute conditions defined in accordance with functions respectively are compared, but there is no consideration for processing path information such that some (start point) function returns a value of variables as output and some (end point) function takes the value of the variables (returned from the start function) as input (via some processes).

For example, there is the case where the protection attribute cannot be determined appropriately unless attention is paid to the processing path information. For example, in a challenge-and-response protocol included in SSL and TLS (Transport Layer Security), etc. and used frequently in an authentication protocol, a process of signing a concatenation of a random number having integrity and an external input having no integrity is carried out. On this occasion, the former input not only must have integrity but also must be a "random number". In the background art, because a random number having integrity is handled in the same manner as a constant having integrity, it is impossible to determine protection attributes so that the signature is allowed for the random number but the signature is not allowed for the constant.

Similarly, in another challenge-and-response protocol, an output value of a hash function whose input is a concatenation of a random number having integrity and an external input having no integrity pass may be signed. In this case, it is conceived that a condition of signature permission is that a "random number" having integrity is included in input of a hash function. However, in the method according to the background art, information indicating whether a random number having integrity is included in input of a hash function or not, cannot be used, so that a proper protection attribute cannot be determined automatically.

According to the embodiments, it is possible to determine a protection attribute appropriately for each variable in a program in accordance with a security protocol.

The phase 1200 may be formed so that the steps S1201 to S1202 are performed by the information processing apparatus 1 but the step S1203 and the steps after the step S1203 are performed by the programmer.

The invention is not limited to the aforementioned embodiments as they are, but may be embodied while modifying components without departing from the scope of the invention. For example, some components may be removed from components in the embodiments, and components in different embodiments may be suitably combined.

The method in each embodiment may be distributed as a program allowed to be executed by a computer after it is stored in a storage medium such as a magnetic disk (floppy (registered trademark) disk, hard disk, etc.), an optical disk (CD-ROM, DVD, etc.), a magneto-optical disk (MO), a semi-conductor memory, etc.

As long as the storage medium can store a program so that the program can be read by a computer, any storage format may be used as the storage format of the storage medium.

A part of each process for achieving the embodiments may be executed by an OS (Operating System) running on a computer, an MW (middleware) such as a database management software and a network software, etc. based on an instruction given from a program installed in the computer from the storage medium.

The storage medium in the embodiments is not limited to a medium independent of a computer but may include a storage medium in which a transmitted program is downloaded via an LAN, Internet or the like and stored or temporarily stored.

The number of storage media is not limited to one but processing in the embodiment may be executed via plural storage media. Any configuration may be used as the media configuration.

The computer in the embodiments executes respective processes in this embodiment based on a program stored in the storage medium and any configuration of one apparatus such as a personal computer, etc., a system having plural apparatuses connected by a network or the like may be used as the computer.

"Computer" is the general term not only for a personal computer but also for an arithmetic operation processing apparatus included in an information processing apparatus, a micro-computer, etc. That is, "computer" is the general term for an apparatus and a device which can achieve the function of the embodiments by a program.

Although some embodiments have been described, these embodiments are presented by way of example but have no intention of limiting the scope of the invention. These novel embodiments may be carried out in other various modes and can be omitted, replaced or changed variously without departing from the scope of the invention. Not only the embodiments and their modifications but also their equivalents fall within the scope of Claims.

The invention claimed is:

1. An information processing apparatus, comprising:
a program acceptance portion configured to accept a program having procedure information indicating processing to be executed using a first function;
a program storage portion configured to store the program accepted by the program acceptance portion;
a first function type storage portion configured to store at least one piece of first function type information having protection attribute information indicating whether data put into each input variable and each output variable in the first function is stored in a protected memory area or in a non-protected memory area;
a function type extraction portion configured to extract first real function type information as first function type information corresponding to first real function information based on the first function type information and first real function information which is information of the first function included in the program;
a second function type storage portion configured to store the first real function type information;
a first alternate function type storage portion configured to store alternate function type information by which specific procedure information indicating a specific processing using a first function is associated with at least one piece of first function type information which is information substitutable for function type information of the first function executed in the specific procedure when the specific procedure is executed;
an alternate function type extraction portion configured to extract second alternate function type information which is alternate function type information corresponding to the first real function information based on the first alternate function type information and the first real function information;
a second alternate function type storage portion configured to store the second alternate function type information extracted by the alternate function type extraction portion;
a selection portion configured to select and acquire the second alternate function type information stored in the second alternate function type storage portion;
a judging portion configured to determine whether the specific procedure information associated with the second alternate function type information selected by the selection portion is included in the procedure information of the program stored in the program storage portion or not;
an updating portion configured to update the first real function type information stored in the second function type storage portion by using the first real function type information associated with the second alternate function type information selected by the selection portion in accordance with a result of the judging portion; and
a protection attribute determination portion configured to determine coincident protection attribute information as protection attribute information of each variable when protection attribute information of all input/output variables of a first real function coincides with protection attribute information included in any one piece of first real function type information stored in the second function type storage portion with respect to all first real functions in the program stored in the program storage portion.

2. The apparatus of claim 1,
wherein the first function is a security function,
wherein the security function is any one of a function which performs a process having a computational one-wayness property, a function which performs a process of verifying integrity of a value of an input variable, and a function which has input/output variables which can take different protection attributes respectively,
wherein the computational one-wayness property is such a property that a subset is included in a whole set of input/output variables so that a value of a variable not belonging to the subset cannot be calculated in a realistic time from a value of a variable belonging to the subset, and
wherein the integrity is such a property that a value is correct and not falsified.

3. The apparatus of claim 2,
wherein the program further has procedure information indicating processing to be executed using a second function,
wherein the first function type storage portion further stores at least one piece of second function type information in accordance with each second function, the second function type information being defined so that all input/output variables in the second function have the same protection attribute,
wherein the function type extraction portion further extracts second real function type information which is second function type information corresponding to the second real function information based on the second function type information and the second real function information included in the program, and
wherein the protection attribute determination portion determines coincident protection attribute information as protection attribute information of each variable when protection attribute information of all input/output variables in first and second real functions coincides with a protection attribute included in either of the first real function type information stored in the second function type storage portion and the second real function type information with respect to all first and second real functions in the program stored in the program storage portion.

4. A non-transitory computer-readable medium storing an information processing program for enabling a computer to implement a system, the system comprising:

a program acceptance portion configured to accept a program having procedure information indicating processing to be executed using a first function;

a program storage portion configured to store the program accepted by the program acceptance portion;

a first function type storage portion configured to store at least one piece of first function type information having protection attribute information indicating whether data put into each input variable and each output variable in the first function is stored in a protected memory area or in a non-protected memory area;

a function type extraction portion configured to extract first real function type information as first function type information corresponding to first real function information based on the first function type information and first real function information which is information of the first function included in the program;

a second function type storage portion configured to store the first real function type information;

a first alternate function type storage portion configured to store alternate function type information by which specific procedure information indicating a specific processing using a first function is associated with at least one piece of first function type information which is information substitutable for function type information of the first function executed in the specific procedure when the specific procedure is executed;

an alternate function type extraction portion configured to extract second alternate function type information which is alternate function type information corresponding to the first real function information based on the alternate function type information and the first real function information;

a second alternate function type storage portion configured to store the second alternate function type information extracted by the alternate function type extraction portion;

a selection portion configured to store select and acquire the second alternate function type information stored in the second alternate function type storage portion;

a judging portion configured to determine whether the specific procedure information associated with the second alternate function type information selected by the selection portion is included in the procedure information of the program stored in the program storage portion or not;

an updating portion configured to update the first real function type information stored in the second function type storage portion by using the first real function type information associated with the second alternate function type information selected by the selection portion in accordance with a result of the judging portion; and a protection attribute determination portion configured to determine coincident protection attribute information as protection attribute information of each variable when protection attribute information of all input/output variables of a first real function coincides with protection attribute information included in any one piece of first real function type information stored in the second function type storage portion with respect to all first real functions in the program stored in the program storage portion.

* * * * *